US009191670B2

(12) United States Patent
Karczewicz et al.

(10) Patent No.: US 9,191,670 B2
(45) Date of Patent: Nov. 17, 2015

(54) THROUGHPUT IMPROVEMENT FOR CABAC COEFFICIENT LEVEL CODING

(71) Applicant: Qualcomm Incorporated, San Diego, CA (US)

(72) Inventors: Marta Karczewicz, San Diego, CA (US); Jianle Chen, San Diego, CA (US); Wei-Jung Chien, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 13/710,212

(22) Filed: Dec. 10, 2012

(65) Prior Publication Data

US 2013/0182757 A1 Jul. 18, 2013

Related U.S. Application Data

(60) Provisional application No. 61/587,624, filed on Jan. 17, 2012, provisional application No. 61/589,290, filed on Jan. 20, 2012, provisional application No. 61/591,772, filed on Jan. 27, 2012, provisional application No. 61/606,347, filed on Mar. 2, 2012, provisional application No. 61/622,785, filed on Apr. 11, 2012.

(51) Int. Cl.
*H04N 19/64* (2014.01)
*H04N 19/91* (2014.01)
*H04N 19/60* (2014.01)
*H04N 19/70* (2014.01)
*H04N 19/13* (2014.01)
*H04N 19/93* (2014.01)

(52) U.S. Cl.
CPC ......... *H04N 19/00775* (2013.01); *H04N 19/13* (2014.11); *H04N 19/60* (2014.11); *H04N 19/70* (2014.11)

(58) Field of Classification Search
CPC .................................................... H04N 19/647
See application file for complete search history.

(56) References Cited

U.S. PATENT DOCUMENTS

| 7,061,410 | B1 | 6/2006 | Pearson et al. |
| 7,132,964 | B2 | 11/2006 | Tsuru |
| 7,525,456 | B2 | 4/2009 | Watanabe |

(Continued)

FOREIGN PATENT DOCUMENTS

| TW | 201142759 A | | 12/2011 |
| WO | 2011128303 A2 | | 10/2011 |
| WO | WO2011128303 | * | 10/2011 |

OTHER PUBLICATIONS

Bross et al., "WD5: Working Draft 5 of High-Efficiency Video Coding," JCTVC-G1103_d3, version 4, Jan. 9, 2012, 6 pp.

(Continued)

*Primary Examiner* — Sath V Perungavoor
*Assistant Examiner* — Clifford Hilaire
(74) *Attorney, Agent, or Firm* — Shumaker & Sieffert, P.A.

(57) ABSTRACT

This disclosure proposes various techniques for limiting the number of bins that are coded using an adaptive context model with context adaptive binary arithmetic coding (CABAC). In particular, this disclosure proposes to limit the number of bins that use CABAC for coding level information of transform coefficients in a video coding process.

50 Claims, 13 Drawing Sheets

(56) References Cited

U.S. PATENT DOCUMENTS

| | | | |
|---|---|---|---|
| 8,189,776 B2 | 5/2012 | Au et al. | |
| 2005/0038837 A1 | 2/2005 | Marpe et al. | |
| 2006/0017592 A1 | 1/2006 | Shim | |
| 2009/0232204 A1* | 9/2009 | Lee et al. | 375/240.02 |
| 2010/0177820 A1 | 7/2010 | Chono | |
| 2011/0206135 A1 | 8/2011 | Drugeon et al. | |
| 2012/0082233 A1 | 4/2012 | Sze | |
| 2013/0051459 A1 | 2/2013 | Kirchhoffer et al. | |

OTHER PUBLICATIONS

ITU-T H.265, Series H: Audiovisual and Multimedia Systems, Infrastructure of audiovisual services—Coding of moving video, Advanced video coding for generic audiovisual services, the International Telecommunication Union. Oct. 2014, 540 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pages.

Second Written Opinion from International Application No. PCT/US2012/068997, dated Feb. 7, 2014, 8 pp.

International Preliminary Report on Patentability from International Application No. PCT/US2012/068997, dated Apr. 22, 2014, 9 pp.

Alshin et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F254, pp. 1-5.

Amonou et al., "Description of video coding technology proposal by France Telecom, NTT, NTT DOCOMO, Panasonic and Technicolor," ITU-T SG16 WP3 and ISOIIEC JTCIISC29NVG11, Document JCTVC-A114, Dresden, DE, Apr. 15-23, 2010, 42 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 2, 2012, JCTVC-11003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Chen et al: "Non-CE1: throughput improvement on CABAC coefficients level coding," JTCVC-H0554, 8th Meeting: San Jose, CA, Feb. 1-10, 2012, 6 pp.

International Search Report and Written Opinion—PCT/US2012/068997—ISA/EPO—Mar. 7, 2013, 15 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Marpe et al., "Context-based adaptive binary arithmetic coding in the H.264/AVC video compression standard," IEEE Transactions on Circuits and Systems for Video Technology, Jul. 2003, vol. 13(7), pp. 620-636.

Sole et al., "Transform Coefficient Coding in HEVC," IEEE Transactions on Circuits and Systems for Video Technology, vol. 22, No. 12, Dec. 2012, pp. 1765-1777.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 10th Meeting: Geneva, CH, Jan. 14-23, 2013, JCTVC-L1003_v34, 310 pp.

* cited by examiner

| 1 (X=0, Y=0) | 2 (X=1, Y=0) | 3 (X=2, Y=0) | 4 (X=3, Y=0) |
| --- | --- | --- | --- |
| 2 (X=0, Y=1) | 3 (X=1, Y=1) | 4 (X=2, Y=1) | 5 (X=3, Y=1) |
| 3 (X=0, Y=2) | 4 (X=1, Y=2) | 5 (X=2, Y=2) | 6 (X=3, Y=2) |
| 4 (X=0, Y=3) | 5 (X=1, Y=3) | 6 (X=2, Y=3) | 7 (X=3, Y=3) |

FIG. 5

THROUGHPUT IMPROVEMENT FOR CABAC COEFFICIENT LEVEL CODING

This application claims the benefit of U.S. Provisional Application No. 61/587,624, filed Jan. 17, 2012, U.S. Provisional Application No. 61/589,290, filed Jan. 20, 2012, U.S. Provisional Application No. 61/591,772, filed Jan. 27, 2012, U.S. Provisional Application No. 61/606,347, filed Mar. 2, 2012, and U.S. Provisional Application No. 61/622,785, filed Apr. 11, 2012, all of which are hereby incorporated by reference in their entirety.

TECHNICAL FIELD

This disclosure relates to video coding, and more particularly to techniques for coding transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. A video frame alternatively may be referred to as a picture. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded, i.e., the coded block, and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for coding information relating to transform coefficients in a video coding process.

This disclosure proposes various techniques for limiting the number of bins that are coded using an adaptive context model with context adaptive binary arithmetic coding (CABAC) to signal transform coefficients versus the number of bins that are bypass coded. In particular, this disclosure discloses techniques for limiting the number of bins that use CABAC for coding level information of transform coefficients in a video coding process.

In one example of the disclosure, a method of coding transform coefficients in a video coding process comprises coding a significance map flag for transform coefficients in a chunk of transform coefficients, wherein the significance map flag indicates whether or not a particular transform coefficient has an absolute value greater than zero, coding a greater-than-one flag for transform coefficients in a chunk of transform coefficients indicated as having an absolute value larger than zero by the significance map flag, wherein the greater-than-one flag indicates whether or not a particular transform coefficient has an absolute value greater than one, and coding a greater-than-two flag for a first N transform coefficients in the chunk indicated as having an absolute value larger than one by the greater-than-one flag, wherein the greater-than-two flag indicates whether or not the particular transform coefficient has an absolute value greater than two.

In another example of the disclosure, a method of coding transform coefficients in a video coding process comprises coding a significance map flag for transform coefficients in a chunk of transform coefficients, wherein significance map flag indicates whether or not a particular transform coefficient has an absolute value greater than zero, coding a greater-than-one flag for a first M1 transform coefficients in the chunk indicated as having an absolute value larger than zero by the significance map flag, wherein the greater-than-one flag indicates whether or not the particular transform coefficient has an absolute value greater than one, and coding a greater-than-two flag for transform coefficients in the chunk indicated as having an absolute value larger than one by the greater-than-one flag, wherein the greater-than-two flag indicates whether or not the particular transform coefficients has an absolute value greater than two.

In another example of the disclosure, a method of coding transform coefficients in a video coding process comprises coding a significance map flag for transform coefficients in a chunk of transform coefficients, wherein the significance map flag indicates whether or not a particular transform coefficient has an absolute value greater than zero, coding a greater-than-one flag for a first M1 transform coefficients in the chunk indicated as having an absolute value larger than zero by the significance map flag, wherein the greater-than-one flag indicates whether or not the particular transform coefficient has an absolute value greater than one, and coding a greater-than-two flag for a first N transform coefficients in the chunk indicated as having an absolute value larger than one by the greater-than-one flag, wherein the greater-than-two flag indicates whether or not the particular transform coefficients has an absolute value greater than two.

This disclosure also describes a video encoder, a video decoder, apparatuses, and computer-readable mediums storing instructions that may be configured to perform the techniques for signaling transform coefficients described herein.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a conceptual diagram illustrating context-based coding thresholds based on subblock position.

DETAILED DESCRIPTION

In general, this disclosure describes techniques for coding video data. In particular, this disclosure describes techniques for coding transform coefficients in a video encoding and/or decoding process.

Level information (e.g., absolute value and sign) for transform coefficients is typically entropy coded in one of two ways. Some bins of the level information are coded with an adaptive context model (e.g., with context adaptive binary arithmetic coding (CABAC)). Other bins of the level information are coded through a bypass mode with fixed equal probability models (e.g., with an exponential Golomb coder or a Golomb-Rice coder). It has been observed that adaptive context-based bin coding, while promoting bandwidth efficiency, is one of the main bottlenecks of entropy coding.

In view of this drawback, this disclosure presents techniques for improving CABAC throughput. In particular, in some examples, this disclosure proposes techniques for improving CABAC throughput by reducing the number of adaptive context-coded bins, and increasing the number of bypass-coded bins.

Figure 1:
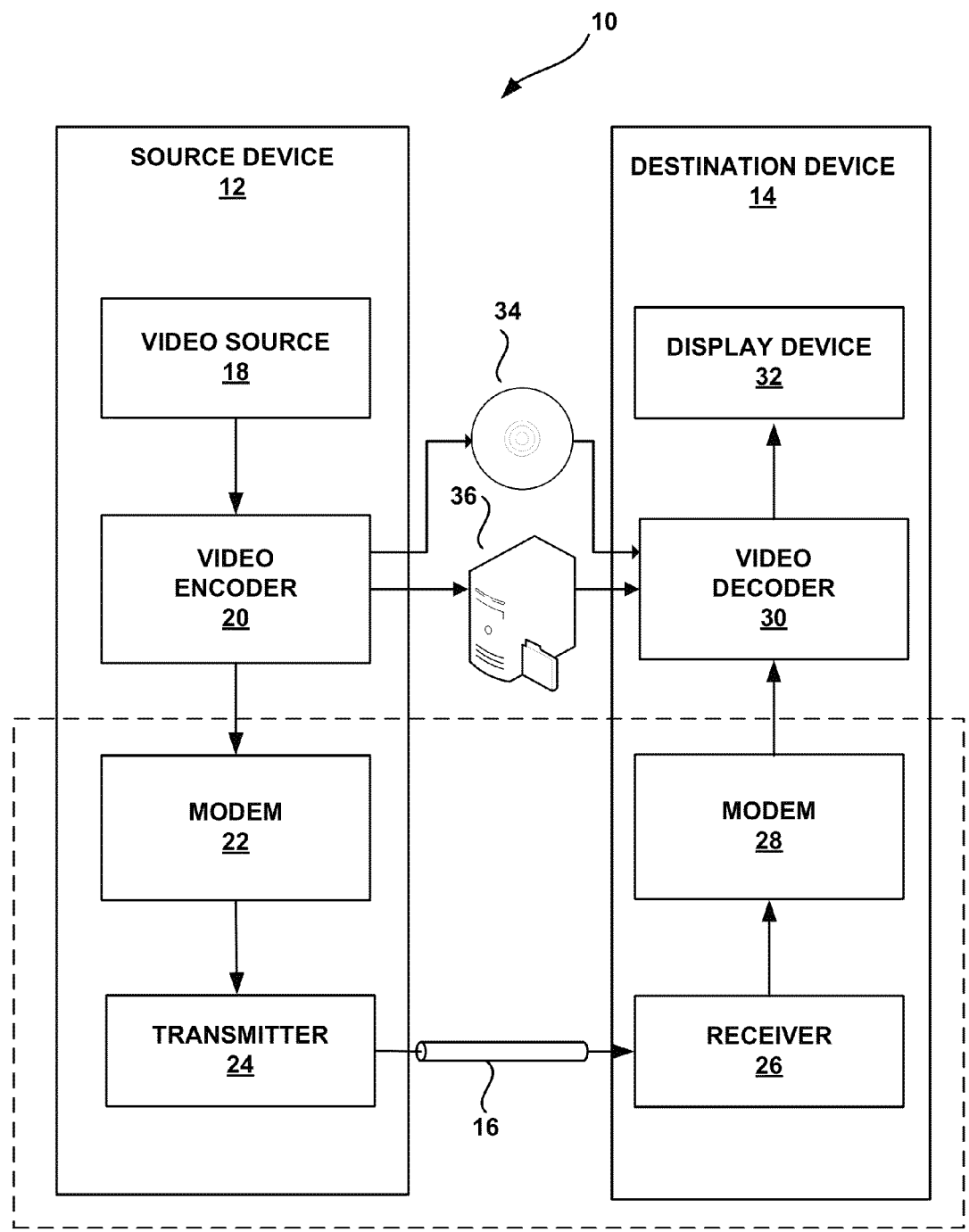
FIG. 1 is a block diagram illustrating an example video encoding and decoding system.

FIG. 1 is a block diagram illustrating an example video encoding and decoding system 10 that may be configured to utilize techniques for coding transform coefficients in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent latest Working Draft (WD) of HEVC is described in document JCTVC-I1003, Bross et al., "High efficiency video coding (HEVC) text specification draft 9," Joint Collaborative Team on Video Coding (JCT-VC) of ITU-T SG16 WP3 and ISO/IEC JTC1/SC29/WG11, and referred to as HEVC WD7 hereinafter, is available from http://phenix.int-evry.fr/jct/doc_end_user/documents/9_Geneva/wg11/JCTVC-I1003-v6.zip.

Alternatively, video encoder 20 and video decoder 30 may operate according to other proprietary or industry standards, such as the ITU-T H.264 standard, alternatively referred to as MPEG 4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for coding transform coefficients in a video coding process. Likewise, video decoder 30 may implement any or all of these techniques for coding transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, video encoder 20 may be configured to code a significance map flag for each transform coefficient in a chunk of transform coefficients, wherein the significance map flag indicates whether or not a particular transform coefficient has an absolute value greater than zero, code a greater-than-one flag for transform coefficients in a chunk of transform coefficients indicated as having an absolute value larger than zero by the significance map flag, wherein the greater-than-one flag indicates whether or not a particular transform coefficient has an absolute value greater than one, and code a greater-than-two flag for a first N transform coefficients in the chunk indicated as having an absolute value larger than one by the greater-than-one flag, wherein the greater-than-two flag indicates whether or not the particular transform coefficient has an absolute value greater than two.

Likewise, video decoder 30 may be configured to decode significance map flags for transform coefficients in a chunk of transform coefficients, wherein the significance map flag indicates whether or not a particular transform coefficient has an absolute value greater than zero, decode a greater-than-one flag for transform coefficients in a chunk of transform coefficients, wherein the greater-than-one flag indicates whether or not a particular transform coefficient has an absolute value greater than one, and decode a greater-than-two flag for a first N transform coefficients in the chunk indicated as having an absolute value larger than one by the greater-than-one flag, wherein the greater-than-two flag indicates whether or not the particular transform coefficient has an absolute value greater than two.

In another example of the disclosure, video encoder 20 may be configured to code a significance map flag for transform coefficients in a chunk of transform coefficients, wherein the significance map flag indicates whether or not a particular transform coefficient has an absolute value greater than zero, code a greater-than-one flag for a first M1 transform coefficients in the chunk indicated as having an absolute value larger than zero by the significance map flag, wherein the greater-than-one flag indicates whether or not the particular transform coefficient has an absolute value greater than one, and code a greater-than-two flag for transform coefficients in the chunk indicated as having an absolute value larger than one by the greater-than-one flag, wherein the greater-than-two flag indicates whether or not the particular transform coefficients has an absolute value greater than two.

Likewise, video decoder 30 may be configured to decode a significance map flag for transform coefficients in a chunk of transform coefficients, wherein the significance map flag indicates whether or not a particular transform coefficient has an absolute value greater than zero, decode a greater-than-one flag for a first M1 transform coefficients in the chunk indicated as having an absolute value larger than zero by the significance map flag, wherein the greater-than-one flag indicates whether or not the particular transform coefficient has an absolute value greater than one, and decode a greater-than-two flag for transform coefficients in the chunk indicated as having an absolute value larger than one by the greater-than-one flag, wherein the greater-than-two flag indicates whether or not the particular transform coefficients has an absolute value greater than two.

In another example of the disclosure video encoder 20 may be configured to code a significance map flag for transform coefficients in a chunk of transform coefficients, wherein the significance map flag indicates whether or not a particular transform coefficient has an absolute value greater than zero, code a greater-than-one flag for a first M1 transform coefficients in the chunk indicated as having an absolute value larger than zero by the significance map flag, wherein the greater-than-one flag indicates whether or not the particular transform coefficient has an absolute value greater than one, and code a greater-than-two flag for a first N transform coefficients in the chunk indicated as having an absolute value larger than one by the greater-than-one flag, wherein the greater-than-two flag indicates whether or not the particular transform coefficients has an absolute value greater than two.

Likewise, video decoder 30 may be configured to decode significance map flags for transform coefficients in a chunk of transform coefficients, wherein significance map flag indicates whether or not a particular transform coefficient has an absolute value greater than zero, decode a greater-than-one flag for a first M1 transform coefficients in the chunk indicated as having an absolute value larger than zero by the significance map flag, wherein the greater-than-one flag indicates whether or not the particular transform coefficient has an absolute value greater than one, and decode a greater-than-two flag for a first N transform coefficients in the chunk indicated as having an absolute value larger than one by the greater-than-one flag, wherein the greater-than-two flag indicates whether or not the particular transform coefficients has an absolute value greater than two.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

The JCT-VC is working on development of the HEVC standard, e.g., as described in the HEVC WD7 discussed above. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. The following section will discuss certain aspects of the HM in more detail.

For video coding according to the HEVC standard currently under development, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

This disclosure is related to techniques for context adaptive binary arithmetic coding (CABAC) entropy coders or other entropy coders, such as probability interval partitioning entropy coding (PIPE) or related coders. Arithmetic coding is a form of entropy coding used in many compression algorithms that have high coding efficiency, because it is capable of mapping symbols to non-integer length codewords. An example of an arithmetic coding algorithm is Context Based Binary Arithmetic Coding (CABAC) used in H.264/AVC.

In general, entropy coding data symbols using CABAC involves one or more of the following steps:

(1) Binarization: If a symbol to be coded is non-binary valued, it is mapped to a sequence of so-called "bins." Each bin can have a value of "0" or "1."

(2) Context Assignment: Each bin (in regular mode) is assigned to a context. A context model determines how a context for a given bin is calculated based on information available for the bin, such as values of previously encoded symbols or bin number.

(3) Bin encoding: Bins are encoded with an arithmetic encoder. To encode a bin, the arithmetic encoder requires as an input a probability of the bin's value, i.e., a probability that the bin's value is equal to "0," and a probability that the bin's value is equal to "1." The (estimated) probability of each context is represented by an integer value called a "context state." Each context has a state, and thus the state (i.e., estimated probability) is the same for bins assigned to one context, and differs between contexts.

(4) State update: The probability (state) for a selected context is updated based on the actual coded value of the bin (e.g., if the bin value was "1," the probability of "1's" is increased).

It should be noted that probability interval partitioning entropy coding (PIPE) uses principles similar to those of arithmetic coding, and can thus also utilize the techniques of this disclosure.

CABAC in H.264/AVC and HEVC uses states, and each state is implicitly related to a probability. There are variants of CABAC, in which a probability of a symbol ("0" or "1") is used directly, i.e., the probability (or an integer version of it) is the state. For example, such variants of CABAC are described in "Description of video coding technology proposal by France Telecom, NTT, NTT DOCOMO, Panasonic and Technicolor," JCTVC-A114, $1^{st}$ JCT-VC Meeting, Dresden, Del., April 2010, referred to as "JCTVC-A114" hereinafter, and A. Alshin and E. Alshina, "Multi-parameter probability update for CABAC," JCTVC-F254, $6^{th}$ JCT-VC Meeting, Torino, IT, July 2011, referred to as "JCTVC-F254" hereinafter.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

In the emerging HEVC standard, position information of the significant transform (e.g., the significance map) is first coded for a TU to indicate the location of the last non-zero coefficient in the scan order. The significance map and the level information (the absolute values and signs of the coefficients) are coded for each coefficient in an inverse scan order.

Figure 2:
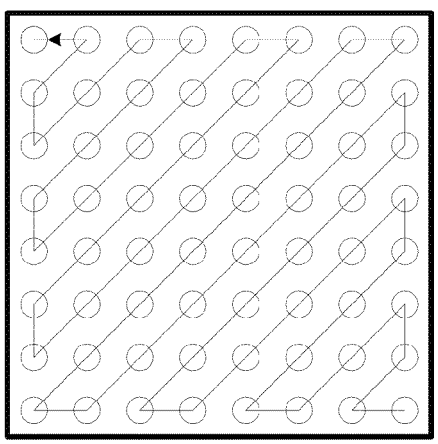
FIG. 2 is a conceptual drawing showing example inverse scan orders for transform coefficient coding.
Figure 2:
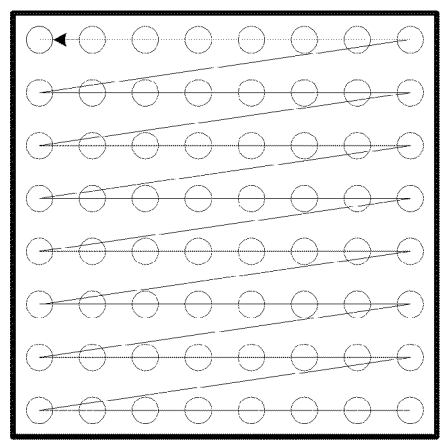
Figure 2:
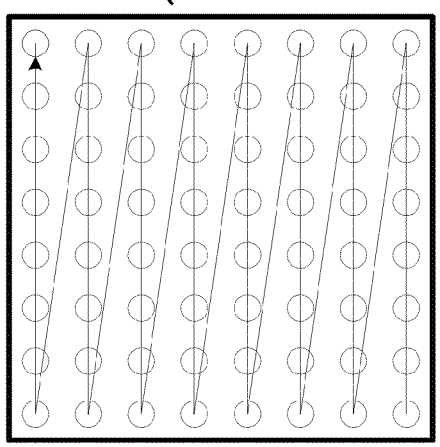
Figure 2:
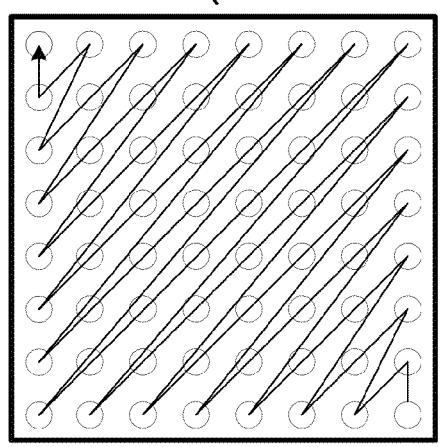

Currently, there are 4 different scans in HEVC: a diagonal scan, a horizontal scan, a vertical scan and a subblock based diagonal scan. FIG. 2 shows examples of inverse scan orders for a block of transform coefficients. Note that each of the inverse diagonal pattern 35, inverse zig-zag pattern 29, the inverse vertical pattern 31, and the inverse horizontal pattern 33 proceed from the higher frequency coefficients in the lower right corner of the transform block to lower frequency coefficients in the upper left corner of the transform block.

The diagonal scan, horizontal scan, and vertical scan are applied for 4×4 and 8×8 TUs. The subblock based diagonal scan is employed in 16×16 and 32×32 TUs in the current HEVC test model. In some examples, the subblock based diagonal scan could also be applied to an 8×8 TU. In a subblock based scan, one 4×4 subblock of a larger TU is scanned before proceeding to another 4×4 subblock within the larger TU. In other examples, a "subblock" may consist of a number of consecutively scanned coefficients according to the scan order used. For example, the "subblock" may consist of 16 consecutively scanned coefficients along a diagonal scan order.

Figure 3:
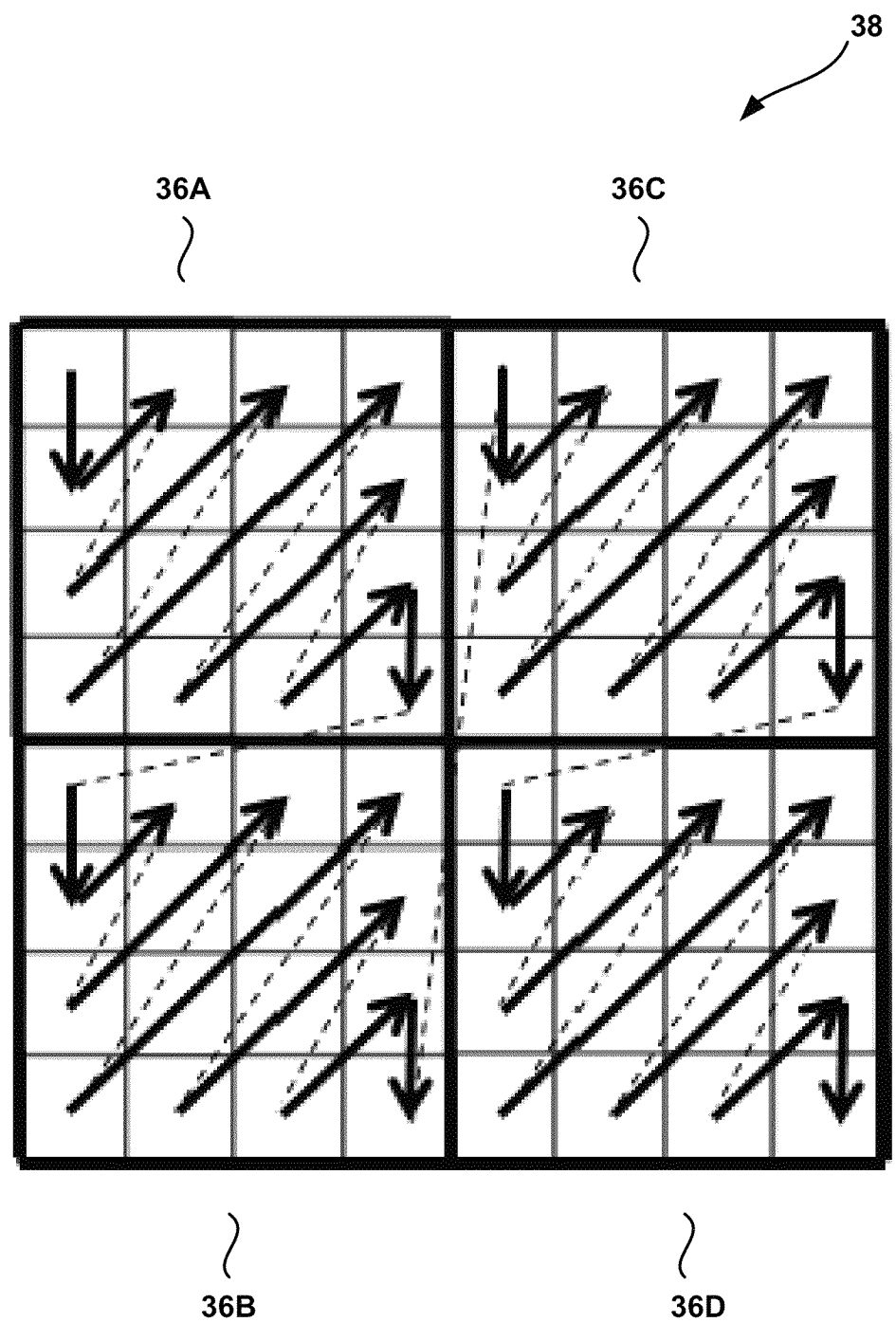
FIG. 3 is a conceptual drawing showing an example sub-block-based diagonal scan.

FIG. 3 depicts an example of a subblock based scan on an 8×8 TU. 8×8 TU 38 consists of four 4×4 subblocks (36A, 36B, 36C, 36D). As shown in FIG. 3, transform coefficients in subblock 36A are scanned before scanning transform coefficients in subblock 36B. The scan then proceeds from subblock 36B to subblock 36C, and finally to subblock 36D. FIG. 3 depicts a forward diagonal scanning order in each subblock; however, any scanning order may be used (e.g., horizontal, vertical, zigzag, etc.). In other examples, inverse scanning orders, such as those shown in FIG. 2, are used within each subblock.

In the emergent HEVC standard, coefficients may be grouped into a chunk. The significance map and level information (absolute value and sign) of the transform coefficients are coded for each chunk. In one example, a chunk consists of 16 consecutive coefficients along a scan order (e.g., a forward or inverse diagonal, horizontal, or vertical scan order) for a 4×4 TU and an 8×8 TU. For 16×16 and 32×32 TUs, a 4×4 subblock of transform coefficients within the larger TU are treated as a chunk. The following symbols are coded and signaled to represent the coefficients level information within a chunk. In one example, all the symbols are encoded in an inverse scan order.

significant_coeff_flag (abbr. sigMapFlag): This flag indicates the significance of each coefficient in a chunk. A coefficient with an absolute value of one or greater is considered to be significant. As one example, a sigMapFlag value of 0 indicates that the coefficient is not significant, while a value of 1 indicates that the coefficient is significant. This flag may generally be referred to as a significance flag.

coeff_abs_level_greater1_flag (abbr. gr1Flag): This flag indicates whether the absolute value of the coefficient is larger than one for any non-zero coefficients (i.e., coefficients with sigMapFlag as 1). As one example, a gr1Flag value of 0 indicates that the coefficient does not have an absolute value greater than one, while a value of 1 for the gr1Flag indicates that the coefficient does have an absolute value greater than one. This flag may generally be referred to as a greater-than-one flag.

coeff_abs_level_greater2_flag (abbr. gr2Flag): This flag indicates whether the absolute value of the coefficient is larger than two for any coefficients with an absolute value larger than one (i.e., coefficients with gr1Flag as 1). As one example, a gr2Flag value of 0 indicates that the coefficient does not have an absolute value greater than two, while a value of 1 for the gr2Flag indicates that the coefficient does have an absolute value greater than two. This flag may generally be referred to as a greater-than-two flag.

coeff_sign_flag (abbr. signFlag): This flag indicates the sign information for any non-zero coefficients (i.e., coefficients with sigMapFlag as 1). For example, a zero for this flag indicates a positive sign, while a 1 indicates a negative sign.

coeff_abs_level_remaining (abbr. levelRem): This syntax element indicates the absolute level values of the remaining coefficients. For this flag, the absolute value of the coefficient minus three is coded (abs(level)−3) for each coefficient with an absolute value larger than two (i.e. coefficients with gr2Flag as 1).

Figure 4:
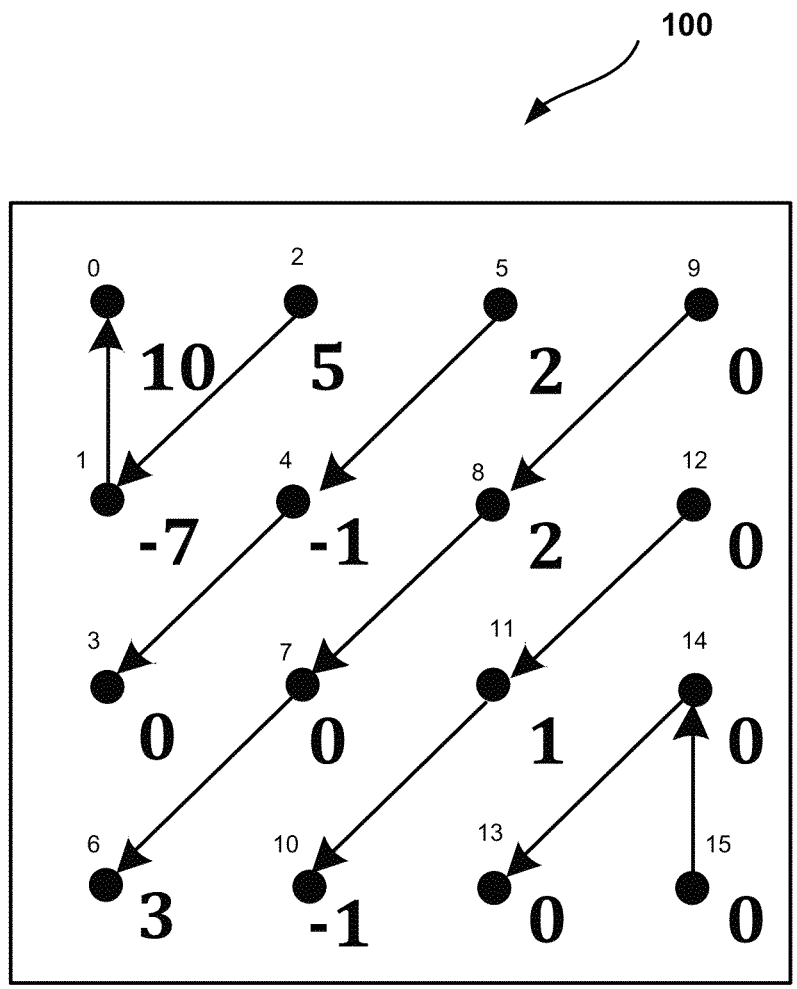
FIG. 4 is a conceptual drawing showing an example inverse diagonal scan of a 4×4 chunk of transform coefficients.

FIG. 4 shows an example of quantized coefficients in a 4×4 block 100. Block 100 may be a 4×4 TU or may be a 4×4 subblock (chunk) in an 8×8, 16×16 or 32×32 TU. The encoded symbols for the coefficients shown in FIG. 4, scanned in an inverse scan order, are summarized in Table 1. In Table 1, scan_pos refers to the position of the coefficient along the inverse diagonal scan shown in FIG. 4. Scan_pos 15 is the first coefficient scanned and is located in the lower left corner of block 100. The quantized coefficient at scan_pos 15 has an absolute value of 0. Scan_pos 0 is the last coefficient scanned and is located in the upper right corner of block 100. The quantized coefficient at scan_pos 0 has an absolute value of 10. In the case of a 4×4 TU or the last 4×4 subblock in a larger TU, the first four sigMapFlags do not need to be coded, since the position of the last non-zero coefficient is known. That is, coding of the sigMapFlag may begin at the last non-zero coefficient (in this example, the coefficient at scan_pos 11).

code. The levelRem syntax is typically coded by binarizing the levelRem value (e.g., remaining level above 2) with a Golomb code and encoding the binarized value in bypass mode with an equal probability model. In summary, this disclosure proposes various example techniques for encoding

TABLE 1

Coded symbols for the coefficients of a 4 × 4 TU or a 4 × 4 chunk

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | -1 | 0 | 2 | 0 | 3 | 2 | -1 | 0 | 5 | -7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |
| gr2Flag | | | | | | | | 0 | | 1 | 0 | | | 1 | 1 | 1 |
| signFlag | | | | | 0 | 1 | | 0 | | 0 | 0 | 1 | 1 | 0 | 1 | 0 |
| levelRem | | | | | | | | | | 0 | | | | 2 | 4 | 7 |

Among these symbols, the bins of sigMapFlag, gr1Flag and gr2Flag are encoded with adaptive context models. The signFlag and binarized bins of levelRem are encoded through bypass mode with fixed equal probability models (e.g., an exponential Golomb code). In the current HEVC design, three flag bins are encoded with adaptive context models for a coefficient with an amplitude larger than zero. It has been observed that context-based bin coding is one of the main bottlenecks of entropy coding.

In view of this drawback, this disclosure presents techniques for improving CABAC throughput. In particular, this disclosure proposes techniques for improving CABAC throughput by reducing the number of context-coded bins, and increasing the number of bypass-coded bins.

In the emerging HEVC standard, the coefficient level information is coded in an inverse scan order. This typically means that higher frequency transform coefficients (coefficients nearer the lower right corner of the block) are scanned first. In such a design, the initial coefficients in the inverse scan order tend to have small absolute values. If such coefficients are significant, they tend to have a higher possibility of having an absolute value of 1 or 2. For those coefficients, using the explicit symbols gr1Flag and gr2Flag can reduce the length of binarized bins to represent the coefficient level, and the gr1Flag and gr2Flag can be efficiently encoded by an arithmetic coding engine with an assigned context according to previously coded contents.

However, in the case of the remaining coefficients in the inverse scan order, using the symbols gr1Flag and gr2Flag may not improve the compression performance since the coefficients tend to have larger absolute level values. Using gr1Flag and gr2Flag can even degrade the coding efficiency.

One goal of this disclosure is to decrease the number of context-coded bins by adaptively switching the explicit gr1Flag and gr2Flag into levelRem syntax, which is coded using bypass mode with a fixed probability model. Bypass mode is handled by a bypass coding engine that operates differently than a CABAC engine. The bypass coding engine may use, for example, a Golomb or exponential Golomb the explicit sigMapFlag, gr1Flag and/or gr2Flag for only a subset of coefficients of a chunk or a TU.

In one example, this disclosure proposes to limit the number of coefficients in a chunk that are explicitly encoded with the gr2Flag. In some proposals for HEVC, the number of coefficients explicitly encoded with the gr2Flag in a chunk can be up to 16 coefficients (e.g., all coefficients of the chunk in a case when the absolute values of all coefficients are larger than one). This disclosure proposes to encode the explicit gr2Flag for only the first N coefficients in the chunk along the scan order having an absolute value greater than one (i.e., coefficients with gr1Flag as 1). The value N may be selectable by a video encoder and may be set to any value from 0 to 16. In another example, N is selected to be any value less than 16, e.g., such that less than all of the coefficients in a set of 16 coefficients are coded with the gr2Flag syntax element. N equal to zero means that the symbol gr2Flag is not coded at all.

As one example, the disclosure proposes to apply a fixed N value for all chunks. In one particular example, N is set to 1. As such, the gr2Flag is only coded for the first coefficient where gr2Flag coding is performed (i.e., for the first coefficient having an absolute value greater than 1 (gr1Flag of 1)). The gr2Flag need not be coded if the gr1Flag has already been coded to indicate that the transform coefficient is not larger than 1. In this case, the transform coefficient is now known not to be greater than 2, so coding the gr2Flag is not necessary. Using 1 as the value of N provides a trade-off between coding efficiency and the number of context-based bins. Values of 2 or 4 may also be appropriate for N, though any value of N may be chosen.

Table 2 shows the symbols to be coded for the example chunk in FIG. 4 when N is equal 1. Compared with the coded symbols in Table 1, five gr2Flags in the positions marked with an X are skipped (scan_pos 6, 5, 2, 1 0). Correspondingly, levelRem of the coefficients at scan positions 6, 5, 2, 1, and 0 are changed compared to those shown in Table 1. For these positions, the value of the levelRem bin is calculated with (abs(level)−2) instead of (abs(level)−3).

TABLE 2

Coded symbols for chunk when N is equal to 1

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | -1 | 0 | 2 | 0 | 3 | 2 | -1 | 0 | 5 | -7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |

TABLE 2-continued

| Coded symbols for chunk when N is equal to 1 | | | | | | | | | | | | | | | | |
|---|---|---|---|---|---|---|---|---|---|---|---|---|---|---|---|---|
| Scan_pos | 15 | 14 | 13 | 12 | 11 | 10 | 9 | 8 | 7 | 6 | 5 | 4 | 3 | 2 | 1 | 0 |
| gr2Flag  |    |    |    |    |    |    |   | 0 |   | X | X |   |   | X | X | X |
| signFlag |    |    |    |    |    | 0  | 1 |   |   | 0 | 0 | 1 | 1 | 0 | 1 | 0 |
| levelRem |    |    |    |    |    |    |   |   |   | 1 | 0 |   |   | 3 | 5 | 8 |

When limiting the number of explicit gr2Flag to N as described above, the coded symbols for coefficient levels in a chunk can be summarized as follows:

sigMapFlag: indicates whether the absolute value of the coefficient is larger than zero.

gr1Flag: indicates whether the absolute value of the coefficient is larger than one for coefficients with sigMapFlag of value 1.

gr2Flag: indicates whether the absolute value of the coefficient is larger than two for the first N coefficients with gr1Flag of value 1.

signFlag: indicates the sign of coefficients with sigMapFlag as 1.

levelRem: indicates the absolute level value for the remaining coefficients; the value (abs(level)−3) is used for the coefficients with gr2Flag of value 1; the value (abs(level)−2) is signaled for the coefficients where the explicit gr2Flag is not coded (indicated with an X in Table 2) and gr1Flag of value 1.

In accordance with the above-described techniques, video encoder 20 and/or video decoder 30 may be configured to code significance map flags for transform coefficients in a chunk of transform coefficients, wherein the significance map flag indicates whether or not a particular transform coefficient has an absolute value greater than zero, code a greater-than-one flag for transform coefficients in a chunk of transform coefficients, wherein the greater-than-one flag indicates whether or not a particular transform coefficient has an absolute value greater than one, code a greater-than-two flag for a first N transform coefficients in the chunk indicated as having an absolute value larger than one by the greater-than-one flag, wherein the greater-than-two flag indicates whether or not the particular transform coefficient has an absolute value greater than two, and code a level remaining value for transform coefficients in the chunk. The remaining coefficients value represents the absolute value of a corresponding coefficient minus three for transform coefficients in the chunk having a coded greater-than-two flag as 1, and the remaining coefficients value represents the absolute value of a corresponding coefficient minus two for transform coefficients in the chunk having a coded greater-than-one flag as 1, but a greater-than-two flag is not coded.

In another example, this disclosure proposes to limit the number of coefficients in a chunk that are explicitly encoded with the gr1Flag. In some proposals for HEVC, the number of coded gr1Flag syntax elements in a chunk can reach 16 in cases where all of the coefficients are significant. As one example, this disclosure proposes to encode the explicit gr1Flag only for the first M1 non-zero coefficients along an inverse scan order in a chunk. M1 may be selected to be any value from 0 to 16. In another example, M1 is selected to be any value less than 16, e.g., such that less than all of the coefficients in a set of 16 coefficients are coded with the gr1Flag syntax element. M1 equal to zero means that the symbol gr1Flag is not encoded at all.

In one example, this disclosure proposes to apply a fixed M1 value for all chunks. In one particular example M1 is set to 8. As such, the gr1Flag is only coded for the first eight coefficients where gr1Flag coding is performed (i.e., for the first eight coefficients having an absolute value greater than 0 (sigMapFlag of 1)). Using 8 as the value of M1 provides a trade-off between coding efficiency and the number of context-based bins. 2 or 4 may also be appropriate values of M1 for the coefficients in a chunk. Table 3 shows the symbols to be coded for the example chunk in FIG. 4 when M1 is equal to 4. Table 4 shows the symbols to be coded for the example chunk in FIG. 4 when M1 is equal to 8. Compared with the symbols in Table 1, five gr1Flag and four gr2Flag in the positions marked X are skipped when M1 equals to 4. Compared with the symbols in Table 1, one gr1Flag and one gr2Flag in the positions marked X are skipped when M1 equals to 8. For the positions marked with an X in Tables 3 and 4, the value of the levelRem bin is calculated with (abs(level)−1) instead of (abs(level)−3).

TABLE 3

| Coded symbols for chunk when M1 is equal to 4 | | | | | | | | | | | | | | | | |
|---|---|---|---|---|---|---|---|---|---|---|---|---|---|---|---|---|
| Scan_pos | 15 | 14 | 13 | 12 | 11 | 10 | 9 | 8 | 7 | 6 | 5 | 4 | 3 | 2 | 1 | 0 |
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag |   |   |   |   | 0 | 0 |   | 1 |   | 1 | X | X |   | X | X | X |
| gr2Flag |   |   |   |   |   |   |   | 0 |   | 1 | X |   |   | X | X | X |
| signFlag |   |   |   |   | 0 | 1 |   | 0 |   | 0 | 0 | 1 | 1 | 0 | 1 | 0 |
| levelRem |   |   |   |   |   |   |   |   |   | 0 | 1 |   |   | 4 | 6 | 9 |

TABLE 4

| Coded symbols for chunk when M1 is equal to 8 | | | | | | | | | | | | | | | | |
|---|---|---|---|---|---|---|---|---|---|---|---|---|---|---|---|---|
| Scan_pos | 15 | 14 | 13 | 12 | 11 | 10 | 9 | 8 | 7 | 6 | 5 | 4 | 3 | 2 | 1 | 0 |
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag |   |   |   |   | 0 | 0 |   | 1 |   | 1 | 1 | 0 |   | 1 | 1 | X |

TABLE 4-continued

Coded symbols for chunk when M1 is equal to 8

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| gr2Flag | | | | | | | | 0 | | 1 | 0 | | | 1 | 1 | X |
| signFlag | | | | | 0 | 1 | | 0 | | 0 | 0 | 1 | 1 | 0 | 1 | 0 |
| levelRem | | | | | | | | | | 0 | 1 | | | 2 | 4 | 9 |

When limiting the maximum number of gr1Flags to M1, the coded symbols of the coefficient levels in a chunk can be summarized as follows:

sigMapFlag: indicates whether the absolute value of the coefficient is larger than zero.

gr1Flag: indicates whether the absolute value of the coefficient is larger than one for the first M1 non-zero coefficients (sigMapFlag of value 1).

gr2Flag indicates whether the absolute value of the coefficient is larger than two for coefficients with gr1Flag of value 1.

signFlag: indicates the sign of coefficients with sigMapFlag as 1.

levelRem: indicates the absolute level value for the remaining coefficients; the value (abs(level)−3) is used for coefficients where gr2Flag has a value of 1; the value (abs(level)−1) is used for the non-zero coefficients where explicit gr1Flag is not coded.

In accordance with the above-described techniques, video encoder 20 and/or video decoder 30 may be configured to code a significance map flag for transform coefficients in a chunk of transform coefficients, wherein the significance map flag indicates whether or not a particular transform coefficient has an absolute value greater than zero, code a greater-than-one flag for a first M1 transform coefficients in the chunk indicated as having an absolute value larger than zero by the significance map flag, wherein the greater-than-one flag indicates whether or not the particular transform coefficient has an absolute value greater than one, and code a greater-than-two flag for transform coefficients in the chunk indicated as having an absolute value larger than one by the greater-than-one flag, wherein the greater-than-two flag indicates whether or not the particular transform coefficients has an absolute value greater than two. Video encoder 20 and/or video decoder 30 may be further configured to code a level remaining value for transform coefficients in the chunk. The remaining coefficients value represents the absolute value of a corresponding coefficient minus three for transform coefficients in the chunk having a coded greater-than-two flag as 1, and the remaining coefficients value represents the absolute value of a corresponding coefficient minus one for transform coefficients in the chunk having a coded significance map flag, but a greater-than-one flag is not coded.

The above-described methods of limiting the number of explicitly coded gr1Flags and gr2Flags can be combined. In this example, the coded symbols for coefficient levels in a chunk can be summarized as follows (in principle, N shall be the same as or smaller than M1):

sigMapFlag: indicates whether the absolute value of the coefficient is larger than zero.

gr1Flag: indicates whether the absolute value of the coefficient is larger than one for the first M1 non-zero coefficients (sigMapFlag of value 1).

gr2Flag: indicates whether the absolute value of the coefficient is larger than two for the first N coefficients with gr1Flag of value 1.

signFlag: indicates the sign of coefficients with sigMapFlag as 1.

levelRem: indicates the absolute level value for the remaining coefficients; the value (abs(level)−3) is used for the coefficients where gr2Flag has a value of 1; the value (abs(level)−2) is used for the coefficients where explicit gr2Flag is not coded and gr1Flag has a value of 1; the value (abs(level)−1) is used for the non-zero coefficients where explicit gr1Flag is not coded.

Table 5 below shows the symbols to be coded for the example chunk in FIG. 4 when both the explicit gr2Flag (N is equal to 1) and the explicit gr1Flags (M1 is equal to 8) are limited. Compared with the symbols in Table 1, one gr1Flag and five gr2Flags in the positions marked X are skipped when M1 equals 8 and N equals 1.

TABLE 5

Coded symbols for chunk when M1 is equal to 8 and N is equal to 1

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | X |
| gr2Flag | | | | | | | | 0 | | X | X | | | X | X | X |
| signFlag | | | | | 0 | 1 | | 0 | | 0 | 0 | 1 | 1 | 0 | 1 | 0 |
| levelRem | | | | | | | | | | 1 | 0 | | | 3 | 5 | 9 |

In accordance with the above-described techniques, video encoder 20 and/or video decoder 30 may be configured to code a significance map flag for transform coefficients in a chunk of transform coefficients, wherein the significance map flag indicates whether or not a particular transform coefficient has an absolute value greater than zero, code a greater-than-one flag for a first M1 transform coefficients in the chunk indicated as having an absolute value larger than zero by the significance map flag, wherein the greater-than-one flag indicates whether or not a particular transform coefficient has an absolute value greater than one, and code a greater-than-two flag for a first N transform coefficients in the chunk indicated as having an absolute value larger than one by the greater-than-one flag, wherein the greater-than-two flag indicates whether or not the particular transform coefficient has an absolute value greater than two. In this example, the video encoder 20 and/or the video decoder 30 is configured to code the greater-than-one flag for a first M1 transform coefficients in the chunk that are non-zero.

The video encoder 20 and/or video decoder 30 may be further configured to code a level remaining value for transform coefficients in the chunk. The level remaining value represents the absolute value of a corresponding coefficient minus three for transform coefficient in the chunk having a coded greater-than-two flag as 1, the level remaining value represents the absolute value of a corresponding coefficient minus two for transform coefficients in the chunk having a coded greater-than-one flag as 1, but a greater-than-two flag is not coded, and the level remaining value represents the absolute value of a corresponding coefficient minus one for transform coefficients in a chunk that are non-zero but do not have a coded greater-than-one flag.

As another example, this disclosure proposes to switch off encoding an explicit gr1Flag for the remaining coefficients in a chunk when a number of previous coefficients in the chunk with an absolute value larger than one (e.g., coded gr1Flag as 1) accumulates to a certain amount M2. M2 can be set to any value from 0 to 16.

In one example, this disclosure proposes to apply a fixed M2 value for all chunks. An M2 value of 1 has shown to provide a good trade-off between coding efficiency and the number of context-based bins. 2 or 4 are also example values of M2 for the coefficients in a chunk. Table 6 shows the symbols to be coded for the example chunk in FIG. 4 when M2 is equal 1. Compared with the coded symbols in Table 1, six gr1Flag in the positions marked as an X are not coded. For these positions, levelRem coding is used. LevelRem is calculated with (abs(level)−1) instead of (abs(level)−3) as in Table 1.

As described above, the number of coded bins coded for the gr1Flag is dependent on the value of previously coded gr1Flags in the chunk. This may hinder the bin coding throughput, as a video coder must keep track of previously coded gr1Flags in the chunk. To alleviate the impact of this dependency, a video coder may be configured to encode a group of gr1Flags together, and then determine whether to switch off encoding an explicit gr1Flag for the remaining coefficients after encoding all gr1Flag in one group. A group of gr1Flags may consist of a fixed number of gr1Flags. Example group size may be 2, 3 or 4 gr1Flags.

Another example, that may alleviate the impact of this dependency, involves encoding an additional group of gr1Flags after the number of previously-coded coefficients with amplitude large than one (i.e., coded gr1Flag as 1) accumulates to a certain amount M2. After this additional group is coded, coding of explicit gr1Flags is switched off (i.e., the gr1Flag is not coded, but instead a levelRem value is coded in bypass mode). Example sizes of the additional group may be 1, 2 or 3 coefficients.

This proposed method of limiting the number of explicitly coded gr1Flags when the number of previously coded gr1Flags in the chunk accumulates to a value M2 may be also combined with the method of limiting the maximum number of gr2Flags to N. The coded symbols for coefficient levels in a chunk can be summarized as follows (in principle, N shall be smaller M2):

sigMapFlag: indicates whether the absolute value of the coefficient is larger than zero.

gr1Flag: indicates whether the absolute value of the coefficient is larger than one for coefficients when the accumulated number of previously-coded gr1Flags with a value of 1 is less than M2.

TABLE 6

Coded symbols for a chunk when M2 is equal to 1

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | X | X | X | | X | X | X |
| gr2Flag | | | | | | | | 0 | | X | X | | | X | X | X |
| signFlag | | | | | 0 | 1 | | 0 | | 0 | 0 | 1 | 1 | 0 | 1 | 0 |
| levelRem | | | | | | | | | | 2 | 1 | | | 4 | 6 | 9 |

When using the method of switching off explicit gr1Flag coding for the remaining coefficients when the number of previously encoded gr1Flags with a value of 1 in inverse scan order accumulates to M2, the coded symbols for coefficient levels in a chunk can be summarized as follows:

sigMapFlag: indicates whether the absolute value of the coefficient is larger than zero.

gr1Flag: indicates whether the absolute value of the coefficient is larger than one for the non-zero coefficients when the accumulated amount of previously coded gr1Flags with a value equal to 1 is less than M2.

gr2Flag: indicates whether the absolute value of the coefficient is larger than two for the coefficients with gr1Flag coded as 1.

signFlag: indicates the sign of coefficients with sigMapFlag as 1.

levelRem: indicates the absolute level value for the remaining coefficients; the value (abs(level)−3) is coded for the coefficients where gr2Flag is coded as 1; the value (abs(level)−1) is coded for the non-zero coefficients where the explicit gr1Flag is not coded.

gr2Flag: indicates whether the absolute value of the coefficient is larger than two for the first N coefficients with gr1Flag coded as 1.

signFlag: indicates the sign of coefficients with sigMapFlag as 1.

levelRem: indicates the absolute level value for the remaining coefficients; the value (abs(level)−3) is coded for the coefficients where gr2Flag is coded as 1; the value (abs(level)−2) is coded for the coefficients where explicit gr2Flag is not coded and the gr1Flag is coded as 1; and the value (abs(level)−1) is coded for the non-zero coefficients where explicit gr1Flag is not coded.

In another example of this disclosure, all of the techniques described above may be combined to reduce the number of explicitly coded grFlags and gr2Flags. The coded symbols for coefficient levels in a chunk in the combined method can be summarized as follows (in principle, M1 shall be larger than M2):

sigMapFlag: indicates whether the absolute value of the coefficient is larger than zero.

gr1Flag: indicates whether the absolute value of the coefficient is larger than one for the first M1 non-zero coefficients (sigMapFlag of value 1) and when the accumulated number of previously coded gr1flags with value of 1 is less than M2. If either of these condition are not met, the gr1Flag is not coded.

gr2Flag: indicates whether the absolute value of the coefficient is larger than two for the first N coefficients with gr1flag coded as 1.

signFlag: indicates the sign of coefficients with sigMapFlag as 1.

levelRem: indicates the absolute value of the remaining coefficients; the value (abs(level)−3) is coded for the coefficients where gr2flag is coded as 1; the value (abs(level)−2) is coded for the coefficients where explicit gr2flag is not coded and gr1flag is coded as 1; and the value (abs(level)−1) is coded for the non-zero coefficients where explicit gr1flag is not coded.

This disclosure also proposes to limit the number of explicitly encoded sigMapFlags for the coefficients in a chunk. In earlier proposals for HEVC, the number of coded sigMapFlags in a chunk may be as many as 16 sigMapFlags in the case of a non-last chunk in a large TU.

In another example, this disclosure proposes to encode the explicit sigMapFlag for the first K1 coefficients in an inverse scan order in a chunk. K1 may be selected by a video encoder to be set to any value from 0 to 16. In another example, K1 is set to any value less than 16. K1 equal to zero means the symbol gr1Flag is not explicitly encoded at all.

This disclosure proposes to apply a fixed K1 value for all chunks. A value of 8 for K1 has shown to provide an acceptable trade-off between coding efficiency and the number of context-based bins. 12 is also an appropriate value of K1. Table 7 shows the symbols to be coded for the example chunk in FIG. 4 when K1 is equal 8. Compared with the symbols in Table 1, eight sigMapFlags, six gr1Flags, and five gr2Flags in the positions marked with an X are skipped. Instead, the levelRem symbol is coded for those positions. In this case, levelRem coding uses a direct amplitude value (absolute value) instead of (abs(level)−3), as in Table 1.

TABLE 7

Coded symbols for chunk when K1 is equal to 8

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | X | X | X | X | X | X | X | X |
| gr1Flag | | | | | 0 | 0 | | 1 | | X | X | X | | X | X | X |
| gr2Flag | | | | | | | | 0 | | X | X | | | X | X | X |
| signFlag | | | | | 0 | 1 | | 0 | | 0 | 0 | 1 | | 0 | 1 | 0 |
| levelRem | | | | | | | | | | 3 | 2 | 1 | 0 | 5 | 7 | 10 |

When limiting maximum number of sigMapFlag to a number K1, the coded symbols of coefficient levels in a chunk can be summarized as follows:

sigMapFlag: indicates the significance of each coefficient for the first K1 coefficients in a chunk.

gr1Flag: indicates whether the absolute value of the coefficient is larger than one for the coefficients with sigMapFlag with a value of 1.

gr2Flag: indicates whether the absolute value of the coefficient is larger than two for the coefficients with gr1flag coded as 1.

signFlag: indicates the sign of coefficients with sigMapFlag as 1.

levelRem: indicates absolute level values of the remaining coefficients; the value (abs(level)−3) is coded for the coefficients where gr2flag is coded as 1; the value (abs(level)) is coded for the coefficients where the explicit sigMapFlag is not coded.

The technique of limiting the number of explicitly coded sigMapFlags may also be combined with the proposed methods described above for reducing the number explicitly coded gr1Flags and gr2Flags. In this example, the coding order of levelRem and signFlag may be flipped. That is, levelRem coding may be performed before signFlag coding.

As another example, this disclosure proposes to switch off encoding (i.e., not code) explicit sigMapFlags for the remaining coefficients when the number of previously coded non-zero coefficients (i.e., coded sigMapFlag as 1) accumulates to a certain amount K2. K2 may be selected by a video encoder to be set to any value from 0 to 16. In another example, K2 may be set to any value less than 16. In one example, this disclosure proposes to apply a fixed K2 value for all chunks. A K2 value of 8 has shown to provide an acceptable a trade-off between coding efficiency and the number of context-based bins. 4 or 12 are also appropriate values of K2 for the coefficients in a chunk.

The coded symbols for coefficient levels in a chunk, where explicitly coding the sigMapFlag is switched off (i.e., not coded) when the number of previously coded non-zero coefficients accumulate to a certain amount K2, can be summarized as follows:

sigMapFlag: indicates the significance of each coefficient when the accumulated amount of previously-coded sigMapFlags with a value equal to 1 is less than K2.

gr1Flag: indicates whether the absolute value of the coefficient is larger than one for coefficients where sigMapFlag is coded as 1.

gr2Flag: indicates whether the absolute value of the coefficient amplitude is larger than two for coefficients with gr1flag coded as 1.

signFlag: indicates the sign of coefficients with sigMapFlag as 1.

levelRem: indicates absolute level value for the remaining coefficients; the value (abs(level)−3) is coded for the coefficients where gr2flag is coded as 1; the value (abs(level)) is coded for the coefficients where explicit sigMapFlag is not coded.

This proposed technique can be combined with the other techniques described above for reducing the number of explicitly coded gr1Flags and gr2Flags. In one example, the coding order of levelRem and signFlag may be flipped. That is, levelRem coding may be performed before signFlag coding.

The proposed techniques described above apply fixed thresholds (N, M1, M2, K1, and K2) to limit the number of explicitly coded sigMapFlags, gr1flags and gr2flags. As another example, this disclosure also proposes to signal the thresholds K1, K2, N, M1 and M2 in the high level syntax in an encoded video bitstream, such as in a sequence parameter set (SPS), a picture parameter set (PPS), an adaptation parameter set (APS) or a slice header (SliceHeader) syntax. An encoder may select the best value of those thresholds according to the coefficient statistics of the encoded video content. The decoder may then apply the threshold in an entropy decoding process.

Profiles and levels specify restrictions on bitstreams and hence limits on the capabilities needed to decode the bitstreams. Profiles and levels may also be used to indicate interoperability points between individual decoder implementations. Each profile specifies a subset of algorithmic features and limits that shall be supported by all decoders conforming to that profile. Each level specifies a set of limits on the values that may be taken by the syntax elements of video compress standard. The same set of level definitions is used with all profiles, but individual implementations may support a different level for each supported profile. For any given profile, levels generally correspond to decoder processing load and memory capability. As another example, different thresholds N, M1, M2, K1 and K2 described above in the high level syntax can be applied for different levels and profile. For example, a base profile can use a lower threshold value, while a main profile can use the higher threshold value.

As another example, the thresholds K1, K2, N, M1 and M2 may be adaptively changed according to the related video coding characteristics of the video block being coded. Such characteristics may include quantization parameter, TU size, TU depth, prediction mode, color component type, coefficient statistics of neighboring chunks or blocks, etc.

For example, the thresholds N, M1, M2, K1 and K2 can be determined according to the coefficient statistics in previously coded chunks. In the case of a 4×4 subblock in a large TU, the thresholds N, M1, M2, K1 and K2 can be determined according to the statistics of coefficients of the surrounding subblocks which were previously encoded (e.g., the right and bottom subblock relative to a currently coded subblock). The following example techniques may be applied.

- A smaller value (even zero) is applied for N, M1, M2, K1 and K2 if the coefficients in previously coded (or surrounding) chunks have an average absolute value higher than some threshold. Conversely, a higher value for N, M1, M2, K1 and K2 may be used when the coefficients in the previously coded chunks have an average absolute value lower than some threshold.
- A smaller value (even zero) is applied for N, M1, M2, K1 and K2 if the coefficients in previously coded (or surrounding) chunks have a maximum absolute value higher than some threshold. Conversely, a higher value for N, M1, M2, K1 and K2 may be used when the coefficients in the previously coded chunks have a maximum absolute value lower than some threshold.
- A smaller value (even zero) is applied for N, M1, M2, K1 and K2 if the number of coefficients with an absolute value larger than a certain value in previously coded (or surrounding) chunks is higher than some threshold. Conversely, a higher value for N, M1, M2, K1 and K2 may be used when the number of coefficients with an absolute value larger than a certain value in the previously coded chunks is lower than some threshold.

As one example, if the amount of coefficients with an absolute value larger than one coefficients is higher than some threshold X, explicit coding of gr1Flags and gr2Flags coding may be switched off (i.e., set N, M1 and M2 to zero). Example values of threshold X are 0, 1, and 2.

As another example, the thresholds N, M1, M2, K1, and K2 can be adaptively changed according to the statistics of already encoded syntax elements in a current chunk or block. For example, the thresholds N, M1 and M2 may be dependent on the statistics of sigMapFlag coding in current chunk or block. More specifically, if the number of sigMapFlags with a value of 1 is more than a certain threshold Y, then the explicit coding of gr1Flags and gr2Flags is switched off (i.e., set N, M1 and M2 to zero). The threshold Y could have different values in different profiles and levels.

As another example, the thresholds N, M1, M2, K1 and K2 can be determined according to coefficient statistics in previously coded chunks. In the case of a 4×4 subblock in a large TU, the thresholds N, M1, M2, K1 and K2 can be determined according to the statistics of coefficients with a decaying model of the previously coded subblocks.

As another example, the value of thresholds N, M1, M2, K1 and K2 can be dependent on the value of a quantization parameter (QP) used for coding a the current block. As one example, for the best trade-off between compression performance and encoding throughput, larger thresholds N, M1, M2, K1 and K2 can be applied to the coefficients which are quantized with a high QP, e.g., a QP greater than a threshold, and smaller thresholds N, M1, M2, K1 and K2 can be applied to the coefficients which are quantized with a low QP, e.g., a QP less than or equal to a threshold.

As another example, the value of thresholds N, M1, M2, K1 and K2 can be dependent on TU size. Larger threshold values for N, M1, M2, K1 and K2 can be applied to the coefficients of a TU with a large size, and smaller threshold values for N, M1, M2, K1 and K2 can be applied to the coefficients of a TU with a small size.

As another example, the value of thresholds N, M1, M2, K1 and K2 can be dependent on prediction mode. For example, larger threshold values for N, M1, M2, K1 and K2 can be applied to the coefficients of a block which is predicted with intra-prediction mode, and smaller threshold values for N, M1, M2, K1 and K2 can be applied to the coefficients of a block which is predicted with an inter-prediction mode. As a typical example, M2 is set to 1 and N is set to 1 when the prediction mode is intra mode, and M2 is set to 4 and N is set to 1 when the prediction mode is inter mode.

As another example, the value of thresholds N, M1, M2, K1 and K2 can be dependent on the color component type. For example, larger threshold values for N, M1, M2, K1 and K2 can be applied to the coefficients of a luma component, and smaller threshold values for N, M1, M2, K1 and K2 can be applied to the coefficients of a chroma component, or vice versa.

As another example, the value of thresholds N, M1, M2, K1 and K2 may depend on the position of the subblock in the TU. For example, let X and Y be the horizontal and vertical positions of the subblock within the TU, respectively. For the example of a 16×16 TU, a threshold of 7 may be used for all subblocks with X+Y equal to 6, a threshold of 6 may be used for all the subblocks with X+Y equal to 5, and so on. In short, the threshold equals X+Y+1, in this example. An example of position-based thresholds for 4×4 subblocks in a 16×16 TU is shown in FIG. 5. The X, Y positions of each subblock is shown at the bottom of the subblock, while the threshold used is shown at the center of the subblock.

As another example, the threshold values N, M1, M2, K1 and K2 may depend only on subblock position, but not TU size. For example, the threshold may be min(TH_max, TH_min+X+Y). TH_max and TH_min are two constants that indicate the maximum and the minimum of allowable thresholds, in this example.

As another example, the value of thresholds N, M1 and M2, K1 and K2 may depend on the position of the last significant coefficient. For example, for an inverse scan order, such as that shown in FIG. 4, starting with fixed thresholds for the subblock of the last significant coefficient, a video coder may gradually reduce the threshold subblock by subblock. For example, the thresholds may be reduced by a step size for each successive subblock. As another example, the threshold may be gradually reduced when the subblocks are in different diagonal subblock lines. For example, let X and Y be the horizontal and vertical position of the subblocks. A video coder may use threshold 8 for all subblocks with X+Y equal to Z, use threshold 7 for all the subblocks with X+Y equal to Z−Δ, use threshold 6 for all the subblocks with X+Y equal to Z−2Δ, and so on.

Figure 6:
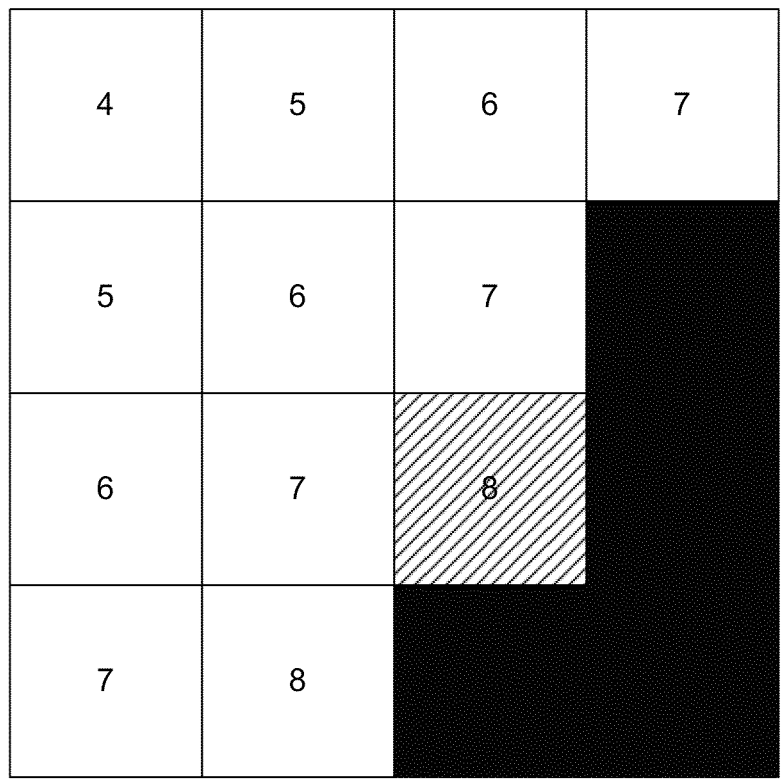
FIG. 6 is a conceptual diagram illustrating context-based coding thresholds based on subblock position and the position of a last significant coefficient.
Figure 7:
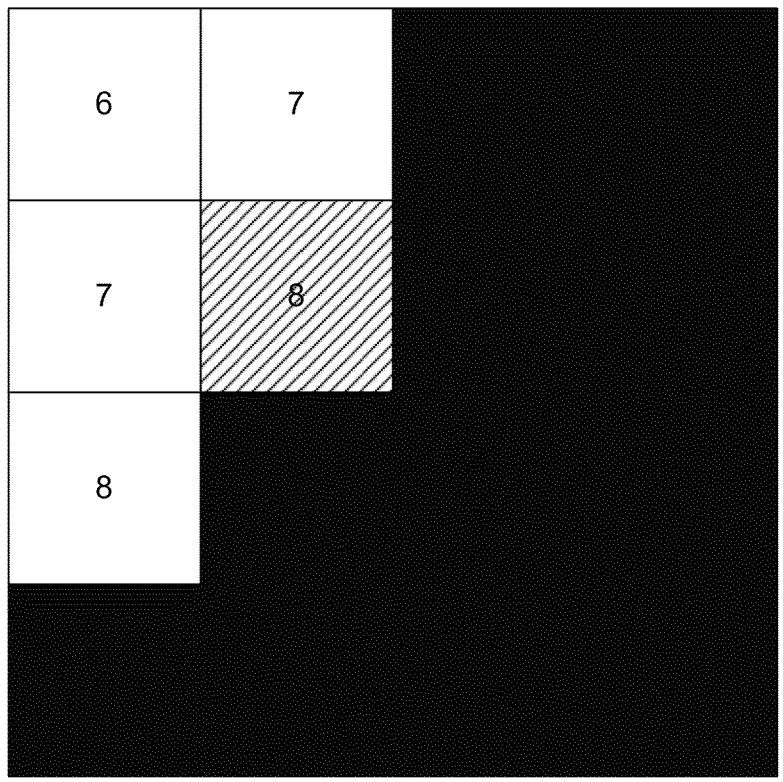
FIG. 7 is a conceptual diagram illustrating context-based coding thresholds based on subblock position and the position of a last significant coefficient.

FIG. 6 and FIG. 7 illustrate the technique of assigning thresholds in a diagonal line beginning at the position of the subblock with the last significant coefficient. The subblock with the last significant coefficient is indicated with diagonal shading. The threshold for the subset having the last significant coefficient may also be changed to depend on the position of the last significant coefficient in the TU or in the subblock.

As discussed above, the proposed techniques of this disclosure limit the number of context-based bins that are applied to coefficients level coding within each chunk (or subblock). This disclosure also proposes to introduce interdependency of neighboring chunks within an entire TU (e.g., a TU larger than 4×4).

For example, if the explicitly encoded gr2Flag has been switched off for at least one coefficient in the current chunk (or subblock), the explicitly coded gr2Flags are automatically switched off for the following chunks which are scanned later in the scan order. Similarly, if the explicitly encoded gr1Flag has been switched off for at least one coefficient in the current chunk (or subblock), explicitly coded gr1Flags are automatically switched off for all the following chunks which are scanned later in the scan order.

As another example, the accumulated amount of large-than-one coefficients (i.e., coefficients that are larger than one) and non-zero coefficients of a current chunk is propagated to a following chunk with a decaying model. For example, the initial number of accumulated "gr1Flag==1" and the number of coded gr2Flags of the current chunk can be calculated based on the amount of "larger-than-one" coefficients in previously coded chunks. Also, the initial number of accumulated coded gr1Flags of the current chunk can be calculated based the amount of non-zero coefficients in previously coded chunks.

As another example, in the case when the chunk is a 4×4 subblock in a large TU, the information concerning level coding of subblocks to the right and to the bottom of the currently coded subblock can be used. For example, the explicitly encoded gr2Flag may be automatically switched off for a subblock if the explicitly encoded gr2Flag has ever been switched off in a subblock to the right and/or bottom of the currently coded subblock. Similarly, the explicitly encoded gr1Flag may be automatically switched off for a subblock if the explicitly encoded gr1Flag has ever been switched off in a subblock to the right and/or bottom of the currently coded subblock.

The proposed techniques described above may also be applied to coefficient level coding of an entire TU, rather than just 4×4 chunks. For example, this disclosure also proposes to encode the explicit gr2Flag for the first $N_{TU}$ coefficients with value greater than one (i.e., gr1Flag coded as 1) of an entire TU in an inverse scan order. $N_{TU}$ is selectable to be any value from 0 to MaxCoeffNum (i.e., the maximum number of coefficients in a TU; 16 in 4×4 TU, 64 in 8×8 TU, 256 in 16×16 TU, 1024 in 32×32 TU). In another example, $N_{TU}$ is set to be any value less than MaxCoeffNum. In one example, a fixed $N_{TU}$ value can be applied to coefficients level coding for all TU sizes. As a trade-off between coding efficiency and the number of context-based bins, $N_{TU}$ can be set to a value of 4. As another example, different $N_{TU}$ values can be applied to variant TU sizes since they exhibit different statistics. Smaller $N_{TU}$ values can be utilized in the case of TUs with smaller sizes, and larger $N_{TU}$ values can be utilized in the case of TUs with larger sizes. As a typical example, $N_{TU}$ can be set to 1 for a 4×4 TU, 2 for an 8×8 TU, 4 for a 16×16 TU and 8 for a 32×32 TU.

This disclosure also proposes to encode the explicit gr1Flag for the first $M1_{TU}$ non-zero coefficients in inverse scan order of an entire TU. $M1_{TU}$ can be set to any value between 0 to MaxCoeffNum of the TU. Different $M1_{TU}$ values may be set for variant TU sizes since they exhibit different statistics. Smaller $M1_{TU}$ values are likely utilized in the case of TUs with smaller sizes, and larger $M1_{TU}$ values are likely utilized in the case of TUs with larger sizes. As a typical example, $M1_{TU}$ can be set to 4 for a 4×4 TU, 8 for an 8×8 TU, 16 for a 16×16 TU and 32 for a 32×32 TU.

This disclosure also proposes to switch off encoding the explicit gr1Flag for the remaining coefficients when the number of previously encoded coefficients with an absolute value larger than one (i.e., coded gr1Flag as 1) in inverse scan order of an entire TU accumulates to a certain amount $M2_{TU}$. $M2_{TU}$ can be set to any value between 0 to MaxCoeffNum. As one example, a fixed $M2_{TU}$ may be applied to coefficients level coding for all TU sizes. As another example, different $M2_{TU}$ values can be set for variant TU sizes. Smaller $M2_{TU}$ values can be utilized in the case of TUs with smaller sizes, and larger $M2_{TU}$ values can be utilized in the case of TUs with larger size. As a typical example, $M2_{TU}$ can be set to 1 for a 4×4 TU, 2 for an 8×8 TU, 4 for a 16×16 TU and 8 for a 32×32 TU.

In another example, this disclosure also proposes to code the explicit sigMapFlag for the first $K1_{TU}$ coefficients in an inverse scan order of an entire TU. $K1_{TU}$ can be set to any value from 0 to MaxCoeffNum (maximum number of coefficients) of the TU. Different $K1_{TU}$ values may be set for variant TU sizes since they exhibit different numbers of maximum coefficients. Smaller $K1_{TU}$ values may be utilized in the case of TUs with smaller sizes, and larger $K1_{TU}$ values may be utilized in the case of TUs with larger sizes. As a typical example, $K1_{TU}$ can be set to 8 for a 4×4 TU, 32 for an 8×8 TU, 128 for a 16×16 TU and 512 for a 32×32 TU.

In another example, this disclosure proposes to switch off encoding explicit sigMapFlags for the remaining coefficients when the number of previously encoded sigMapFlag equal to 1 in a scan order of an entire TU accumulates to a certain amount $K2_{TU}$. $K2_{TU}$ can be set to any value between 0 to MaxCoeffNum. A fixed $K2_{TU}$ can be applied to coefficients level coding for all TU sizes. Alternatively, different $K2_{TU}$ values can be set for variant TU sizes. Smaller $K2_{TU}$ value can be utilized in the case of TUs with smaller sizes, and larger $K2_{TU}$ value can be utilized in the case of TUs with larger sizes. As a typical example, $K2_{TU}$ can be set to 4 for a 4×4 TU, 16 for an 8×8 TU, 32 for a 16×16 TU and 64 for a 32×32 TU.

Each of the above described techniques for limiting the explicit coding of the gr1Flags, gr2Flags, and sigMapFlags for an entire TU may be combined. Also, the adaptive threshold schemes described above for thresholds N, M1, M2, K1 and K2 can also be applied to change $K1_{TU}$, $K2_{TU}$, $N_{TU}$, $M1_{TU}$ and $M2_{TU}$ adaptively. In the scenario of TU-based scheme, the surrounding block means the left and above TU.

In accordance with the techniques described above, the explicit gr1Flag, gr2Flag, and/or sigMapFlag are only coded for a limited number of coefficients in a chunk. As such, more coefficients (including the remaining coefficients with small absolute value) are bypass coded, e.g., with Golomb coding, Golomb-Rice coding or exponential Golomb coding in bypass mode. In accordance with the above techniques, this disclosure also proposes to modify Golomb-Rice code adaptation parameters to accommodate different levelRem values compared to levelRem values coded in previous HEVC test models.

In accordance with some examples of this disclosure, the Golomb-Rice updating method can be adapted according to characteristics of the coefficients being coded. As one example, the GolombRiceParam update process is dependent on the related characteristics of the video block of chunk being coded, such as the quantization parameter, the TU size, the TU depth, the prediction mode, the color component type (e.g., Y, U or V) of the current block, and the coefficients statistics of neighboring chunks or blocks, and so on.

In general, the techniques described in this disclosure switch off coding of one or more of the gr2Flag, gr1Flag and/or sigMapFlag under various conditions within a chunk or within a TU so that Golomb-Rice coding is used earlier. In an alternate example, these decisions may be based on statistics or video coding characteristics, such as the number of significant coefficients, the number of coefficients greater than 1 or greater than 2 in neighboring TU's. Alternatively, the decisions may be based on cumulative statistics since the beginning of a slice. In another example, a flag in higher level syntax (e.g., SPS, PPS, APS or slice header) may indicate that the switch should occur right from the beginning of the slice.

In another example of the disclosure, the sum of absolute values of coefficients coded so far in a chunk, TU, neighboring TUs, or since the beginning of the slice, is used as a criterion for switching off coding of one or more of the gr2Flag, gr1Flag and sigMapFlag.

In general, switching off a particular syntax element, such as the gr2Flag, gr1Flag, or sigMapFlag, may depend on already coded information for that syntax element in the chunk. Switching off a particular syntax element may also depend on information related to significance and level information that was coded for this chunk as well as for the previous chunks and TUs since the beginning of a slice. For example, the decision to switch off coding the gr2Flag may depend on the number of coefficients greater than two previously coded in the current chunk. The decision to switch off coding the gr2Flag may also depend on the number of significant coefficients and/or number of coefficients with absolute magnitude greater than 1 in the whole chunk.

It should be noted that, in one version of the HEVC Test Model (HM5.0), all the sigMapFlags for the whole chunk are sent before sending gr1Flags, and so on. As such, according to the techniques of this disclosure, the coded information of the sigMapFlags in a chunk may be used for determining whether or not to switch off gr1Flag or gr2Flag coding. In a similar manner, all the significance (sigMapFlag) and level information (gr1Flag, gr2Flag, levelRem) from the previous chunks may also be used to make the determination of switching of sigMapFlag, gr1Flag, and/or gr2Flag coding, since all the syntax elements for one chunk are sent before proceeding to the next chunk. If this order (e.g., interleaving) is changed, the switch-off decision may be based on syntax elements corresponding to previously encoded/decoded coefficients from the chunk.

If instead of using chunks, the whole TU is coded, either coefficient-by-coefficient or by using syntax element planes (such as sigMapFlag, gr1Flag etc.), as is done in HM5.0, a spatial region of support may be defined for making the switch off decision for a particular context element. A region of support may be a group of transform coefficients near a transform coefficient being coded. Information encoded/decoded from the region of support for the syntax element to be switched off, as well as syntax elements that are previously coded earlier, can be used in making the decision. For example, a decision to switch off a gr2Flag can use a gr2Flag, a gr1Flag and/or a sigMapFlag from the spatial support region. The spatial region of support may contain a causal neighborhood (i.e., already coded along the scanning order) of transform coefficients in the current TU. The region of support may also contain coefficients at the same frequency location from other TUs. If chunks are being used, the region of support may be noncausal for syntax elements that are coded earlier, e.g., the gr1Flag and sigMapFlag in the examples above.

In all the examples described herein, including the examples where coding of sigMapFlag is switched off, the position of the last non-zero coefficient position is coded using CABAC (or any other entropy coder). To clarify, when all of the sigMapFlags, gr1Flags and gr2Flags are switched off, the position of the last non-zero coefficient in a TU is still coded. This is followed by level information (using Golomb-Rice coding) beginning with the last coefficient and proceeding to the DC coefficient in the inverse scan order.

In some proposals for HEVC, additional methods are introduced for transform coefficient coding. In these methods, the same five syntax elements discussed above are coded. To derive a context for CABAC for the sigMapFlag, gr1Flag and gr2Flag, statistics concerning a neighborhood of coefficients near the currently coding coefficient is used. Statistics concerning a neighborhood of coefficients may also be used to determine the Golomb-rice parameter (Golomb parameter) for the syntax element levelRem.

Figure 8:
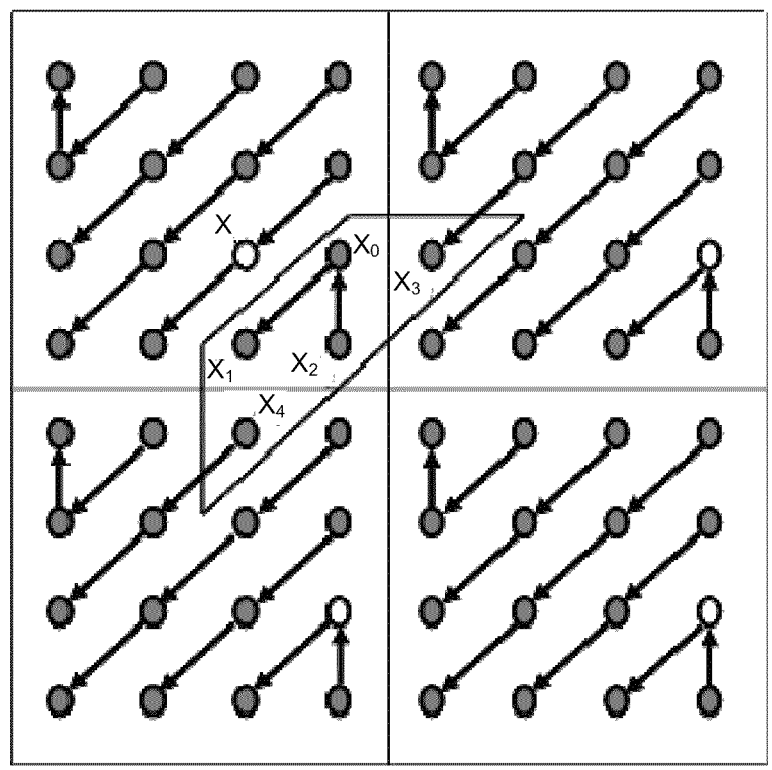
FIG. 8 is a conceptual diagram showing an example division of an 8×8 block into 4 4×4 sub-blocks and a context neighborhood.

An example of a neighborhood used for context derivation for currently coded transform coefficient X, in the case of a diagonal down-left scan, is shown in FIG. 8 with a dotted quadrilateral. The neighborhood is an example for coding of sigMapFlags, but other neighborhoods can be used as well. The coefficients in the neighborhood are labeled as $X_0$, $X_1$, $X_2$, $X_3$, and $X_4$. The context derivation for different syntax elements is based on a function of absolute levels of coefficients in the neighborhood. Instead of coding each subset or chunk in five passes (one pass for each syntax element discussed above), the syntax elements for one transform coefficient can be coded before proceeding to the next coefficient.

As one example, the following quantities can be defined using the context neighborhood. In this example, the summation is over all coefficients in the context neighborhood.

$$\text{num\_significant\_coeff} = \sum \delta_i(x_i) \quad (1)$$

$$\text{with } \delta_i(x_i) = \begin{cases} 1 & x_i \neq 0 \\ 0 & x_i = 0 \end{cases}$$

$$\text{sum\_absolute\_level} = \sum |x_i| \quad (2)$$

$$\text{sum\_absolute\_levelMinus1} = \sum \delta_j(x_i) \quad (3)$$

$$\text{with } \delta_j(x_i) = \begin{cases} |x_i| - 1 & |x_i| > 0 \\ 0 & x_i = 0 \end{cases}$$

Then sum_absolute_level can be used to derive the context index for sigMapFlag, and sum_absolute_levelMinus1 can be used to derive the context indices for gr1Flag and gr2Flag.

As discussed above, the techniques of this disclosure may improve the CABAC throughput by reducing context-coded bins by adaptively switching off the context-coded sigMap-Flag, gr1Flag and gr2Flag coding and switching to Golomb-rice coding. This disclosure also describes techniques for extending these concepts to the techniques of determining a context from neighborhood coefficients and their potential variants.

As one example, a neighborhood region (one typical example of a neighborhood region is shown in FIG. 8) for a current coefficient can be defined, and the coefficients level information within the neighborhood region can be used to make the switch off decision for a particular context element of the current coefficient. For example, a decision to switch off gr2Flag for a coefficient can use the gr2Flag, gr1Flag and/or sigMapFlag within the neighborhood region. A decision to switch off a gr1Flag for a coefficient can use the gr1Flag and/or sigMapFlag within the neighborhood region. When the coefficients are coded in a coefficient-by-coefficient manner, all level information within the neighborhood can be available and can be used to determine whether to switch off a gr2Flag, gr1Flag and/or sigMapFlag of the current coefficient. In some instances, when the values of the following listed information 1-6 are larger than some certain thresholds, the gr2Flag, gr1Flag and/or sigMapFlag of the current coefficient can be switched off 1. Number of significant coefficients within neighborhood region as defined in Equation (1)
2. Summation of absolute level within neighborhood region as defined in Equation (2)
3. Summation of absolute level minus 1 within neighborhood region as defined in Equation (3)
4. Max absolute level within neighborhood region
5. Any other linear or non-linear calculation of the level information within neighborhood region
6. Any other linear or non-linear calculation based on the values in items 1, 2, 3, and/or 4

When the coefficients are coded coefficient-by-coefficient, the above-mentioned neighborhood region only includes causal coefficients. When the coefficients are coded with separated passes, the above-mentioned neighborhood region can also include noncausal coefficients. In some examples, the above-mentioned neighborhood region can be the entire current chunk or even the entire current TU.

As mentioned above, the entire level information of the coefficients within the neighborhood region can be used to make a decision to switch off context-based coding of a syntax element. However, coding the entire level may, in some instances, be a burden on storage resources. Accordingly, in some instances, the coefficients level can be capped to a certain threshold (which can be 2, 3, 7, and so on) and then used to determine whether or not to switch off context-based coding for a particular syntax element for a transform coefficient.

As mentioned above, the decision of whether to switch off a particular context coded syntax element for a coefficient can be made for each coefficient. Alternatively, the switch-off decision for a particular context coded syntax element can be triggered and propagated. For example, once a particular context coded syntax element is switched off for the current coefficient, this particular context coded syntax element can be switched off for all remaining coefficients in a current chunk, or even for all remaining coefficients in a current TU.

Figure 9:
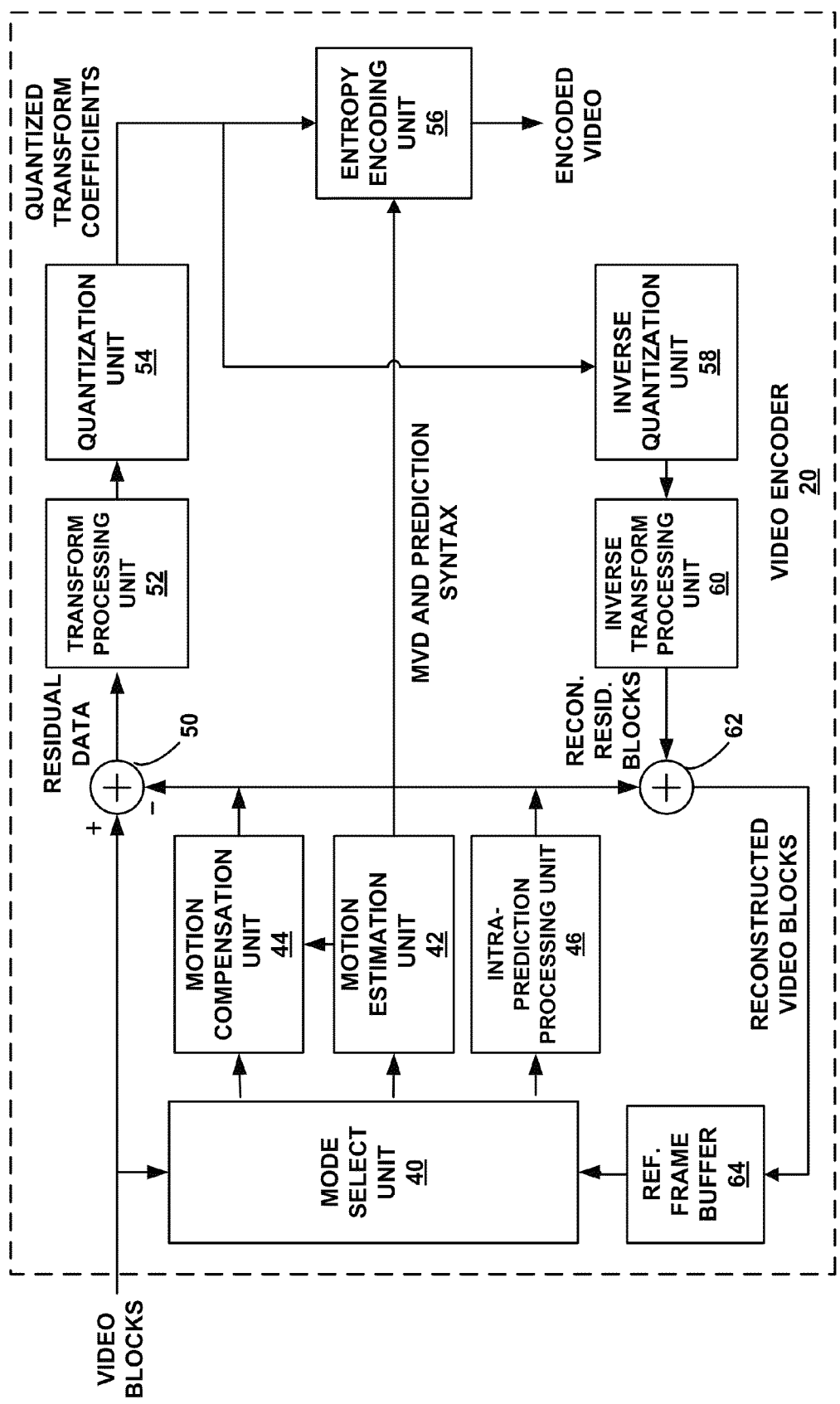
FIG. 9 is a block diagram illustrating an example video encoder.

FIG. 9 is a block diagram illustrating an example of a video encoder 20 that may use techniques for coding transform coefficients as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 9, the video encoder 20 receives a current video block within a video frame to be encoded. In the example of FIG. 9, the video encoder 20 includes a motion compensation unit 44, a motion estimation unit 42, an intra-prediction processing unit 46, a reference frame buffer 64, a summer 50, a transform processing unit 52, a quantization unit 54, and an entropy encoding unit 56. The transform processing unit 52 illustrated in FIG. 9 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform processing unit 60, and a summer 62. A deblocking filter (not shown in FIG. 9) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction processing unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, the intra-prediction processing unit 46 may perform intra-prediction encoding of a block in a P- or B-frame, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction processing unit 46 may intra-predict the received block, as an alternative to inter-prediction performed by the motion estimation unit 42 and the motion compensation unit 44. The intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction processing unit 46 may be configured with a variety of different intra-prediction modes. For example, the intra-prediction processing unit 46 may be configured with a certain number of directional prediction modes, e.g., thirty-four directional prediction modes, based on the size of the CU being encoded.

The intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction processing unit 46 may calculate an error value for the prediction mode based on pixel differences between the PU and the received block to be encoded. The intra-prediction processing unit 46 may continue testing intra-prediction modes until an intra-prediction mode that yields an acceptable error value is discovered. The intra-prediction processing unit 46 may then send the PU to the summer 50.

The video encoder 20 forms a residual block by subtracting the prediction data calculated by the motion compensation unit 44 or the intra-prediction processing unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform processing unit 52 may form one or more transform units (TUs) from the residual block. The transform processing unit 52 selects a transform from among a plurality of transforms. The transform may be selected based on one or more coding characteristics, such as block size, coding mode, or the like. The transform processing unit 52 then applies the selected transform to the TU, producing a video block comprising a two-dimensional array of transform coefficients.

The transform processing unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CABAC, syntax-based context-adaptive binary arithmetic coding (SBAC), Probability Interval Partitioning Entropy (PIPE), or another entropy coding methodology to the coefficients.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform processing unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 10:
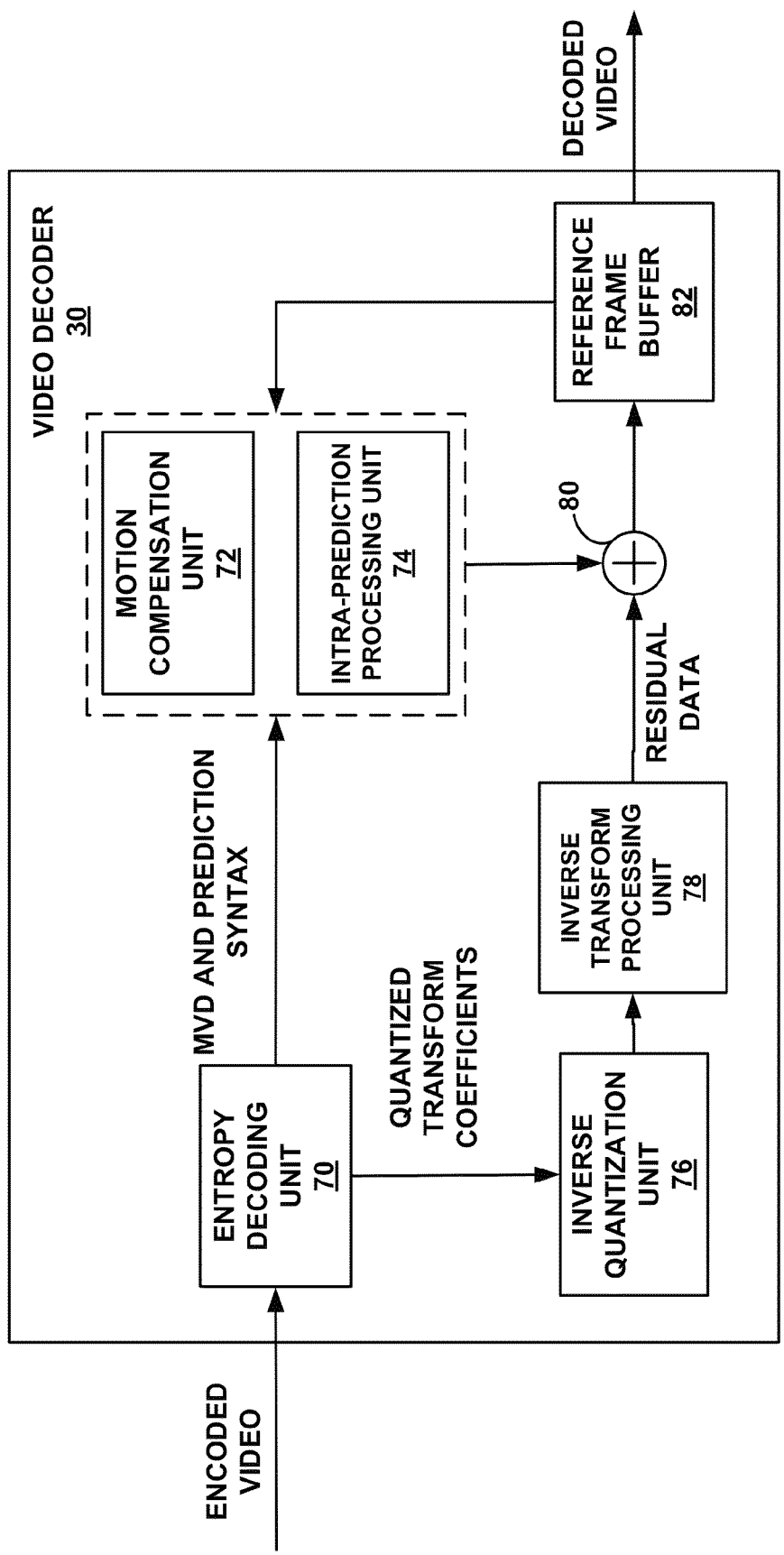
FIG. 10 is a block diagram illustrating an example video decoder.

FIG. 10 is a block diagram illustrating an example of a video decoder 30, which decodes an encoded video sequence. In the example of FIG. 10, the video decoder 30 includes an entropy decoding unit 70, a motion compensation unit 72, an intra-prediction processing unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 9).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform processing unit 78 applies an inverse transform to the inverse quantized transform coefficients. In some examples, the inverse transform processing unit 78 may determine an inverse transform based on signaling from the video encoder 20, or by inferring the transform from one or more coding characteristics such as block size, coding mode, or the like. In some examples, the inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded.

The intra-prediction processing unit 74 may generate prediction data for a current block of a current frame based on a signaled intra-prediction mode and data from previously decoded blocks of the current frame.

The motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on.

Based on the retrieved motion prediction direction, reference frame index, and motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction processing unit 74, in an HEVC example, may use some of the syntax information (e.g., provided by a quadtree) to determine sizes of LCUs used to encode frame(s) of the encoded video sequence. The motion compensation unit 72 and the intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 1).

Figure 11:
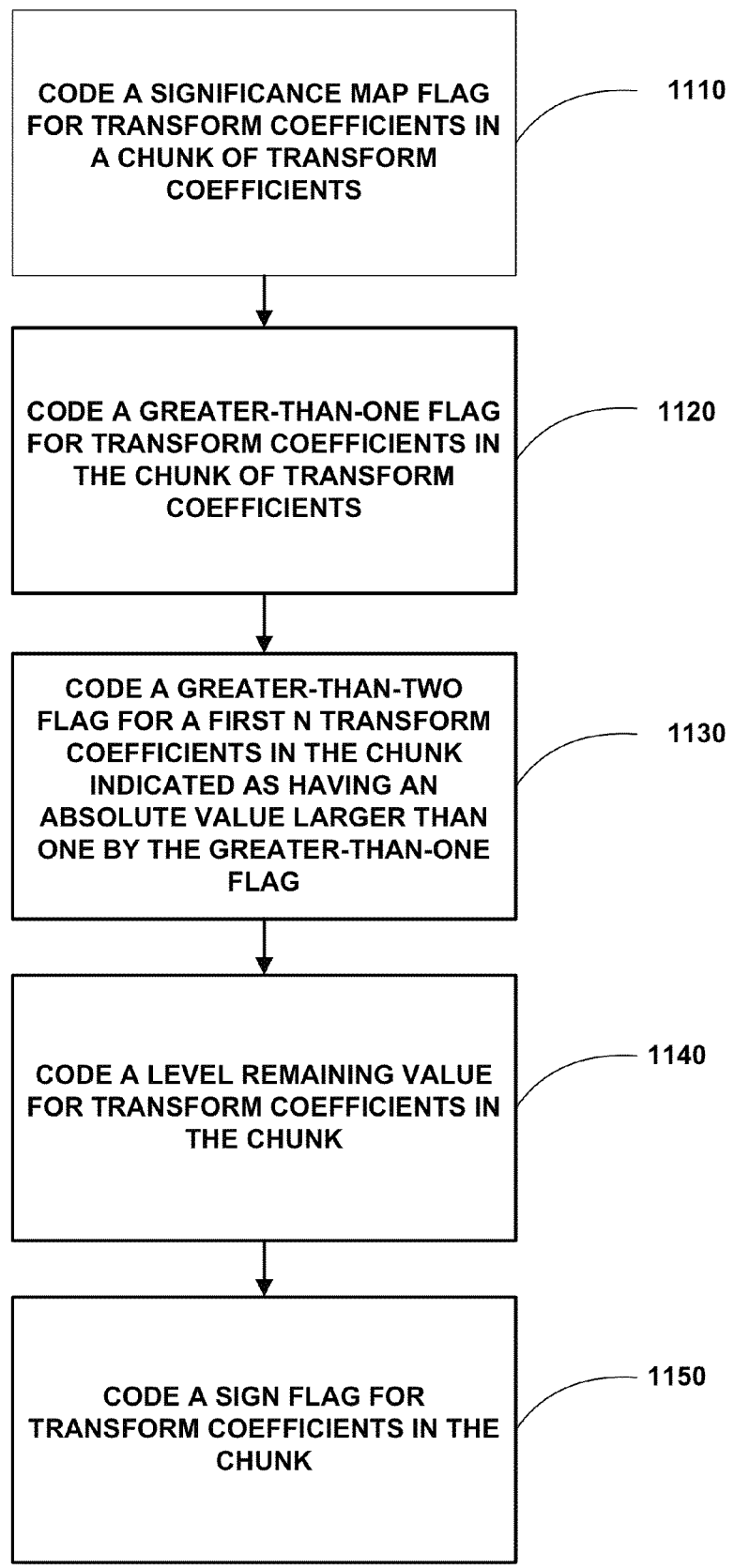
FIG. 11 is a flowchart showing an example method according to the techniques of this disclosure.

FIG. 11 is a flowchart showing an example method according to the techniques of this disclosure. The method of FIG. 11 may be executed by a video coder (e.g., by video encoder 20 of FIG. 9 or by video decoder 30 of FIG. 10).

Video encoder 20 and video decoder 30 (i.e., a video coder) may be configured to perform a method of coding transform coefficients in a video coding process. The video coder may be configured to code a significance map flag for transform coefficients in a chunk of transform coefficients, wherein the significance map flag indicates whether or not a particular transform coefficient has an absolute value greater than zero (1110). The video coder may be further configured to code a greater-than-one flag for transform coefficients in the chunk of transform coefficients indicated as having an absolute value larger than zero by the significance map flag, wherein the greater-than-one flag indicates whether or not a particular transform coefficient has an absolute value greater than one (1120). The video coder may be further configured to code a greater-than-two flag for a first N transform coefficients in the chunk indicated as having an absolute value larger than one by the greater-than-one flag, wherein the greater-than-two flag indicates whether or not the particular transform coefficient has an absolute value greater than two, wherein N is less than a maximum number of transform coefficients in the chunk (1130). In one example, the value of N is 1. In another example, the value of N is based on at least one of a quantization parameter, a transform unit size, a transform unit depth, a color component type, a position of the chunk in a transform unit, a presence of a last significant coefficient in the chunk, and coefficient statistics of a neighboring chunk.

The video coder may be further configured to code a level remaining value for transform coefficients in the chunk (1140). The level remaining value represents the absolute value of a corresponding coefficient minus three for transform coefficients in the chunk having a coded greater-than-two flag as 1. The level remaining value represents the absolute value of a corresponding coefficient minus two for transform coefficients in the chunk having a coded greater-than-one flag as, but the greater-than-two flag is not coded. The video coder may be further configured to code a sign flag for transform coefficients in the chunk, wherein the sign flag indicates the sign of the particular transform coefficient (1150).

In one example of the disclosure, the significance map flag, the greater-than-one flag, and the greater-than-two flag are coded using CABAC with an adaptive context model. The level remaining value is coded using Golomb-Rice coding in CABAC bypass mode. The sign flag is coded in CABAC bypass mode. In another example of the disclosure, the level remaining value is coded using Golomb-Rice coding, wherein Golomb-Rice coding is adapted according to a Golomb parameter. The Golomb Parameter is determined based on at least one of a quantization parameter, a transform unit size, a transform unit depth, a prediction mode, a color component type, and coefficients statistics of neighboring chunks.

In another example of the disclosure, the significance map flag is coded first, the greater-than-one flag is coded second, the greater-than-two flag is coded third, and the level remaining value is coded after the greater-than-two flag. Each of the significance map flag, the greater-than-one flag, the greater-than-two flag, and the level remaining value are coded for the transform coefficients in the chunk according to a scan order. In one example, the scan order is an inverse diagonal scan order.

According to other examples of the disclosure, the chunk is a subblock of a transform unit. The chunk may be a subblock of 16 transform coefficients of a transform unit. In another example, the chunk is an entire transform unit. In another example, the chunk is a number of consecutive transform coefficients along a scan order.

In the case that a video encoder is performing the method of FIG. 11, the method may further comprise encoding pixel data to produce residual video data, transforming the residual video data to produce the chunk of transform coefficients, and signaling the coded significance map flag, the coded greater-than-one flag, and the coded greater-than-two flag, in an encoded video bitstream. Additionally, in another example, the video encoder may signal the value of N in an encoded video bitstream. The value of N may be signaled in at least one of a sequence parameter set, a picture parameter set, an adaptation parameter set, and a slice header.

In the case that a video decoder is performing the method of FIG. 11, the method may further comprise receiving the significance map flag, the greater-than-one flag, and the greater-than-two flag in an encoded video bitstream, inverse transforming the chunk of transform coefficients to produce residual video data, and decoding the residual video data to produce pixel data.

Figure 12:
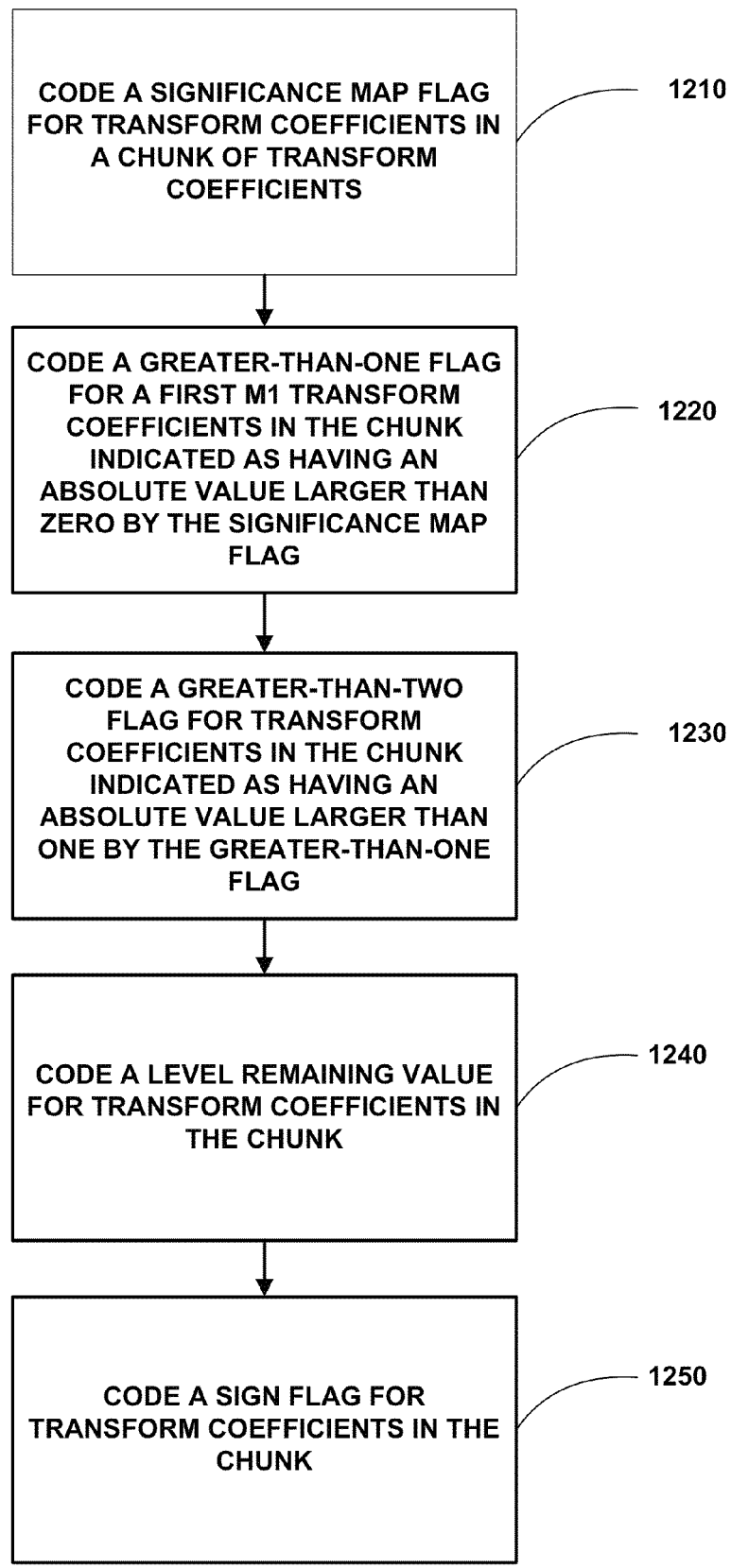
FIG. 12 is a flowchart showing another example method according to the techniques of this disclosure.

FIG. 12 is a flowchart showing another example method according to the techniques of this disclosure. The method of FIG. 12 may be executed by a video coder (e.g., by video encoder 20 of FIG. 9 or by video decoder 30 of FIG. 10).

Video encoder 20 and video decoder 30 (i.e., a video coder) may be configured to perform a method of coding transform coefficients in a video coding process. The video coder may be configured to code a significance map flag for transform coefficients in a chunk of transform coefficients, wherein the significance map flag indicates whether or not a particular transform coefficient has an absolute value greater than zero (1210). The video coder may be further configured to code a greater-than-one flag for a first M1 transform coefficients in the chunk indicated as having an absolute value larger than zero by the significance map flag, wherein the greater-than-one flag indicates whether or not the particular transform coefficient has an absolute value greater than one (1220). M1 is less than a maximum number of transform coefficients in the chunk. The video coder may be further configured to code a greater-than-two flag for transform coefficients in the chunk indicated as having an absolute value larger than one by the greater-than-one flag, wherein the greater-than-two flag indicates whether or not the particular transform coefficients has an absolute value greater than two (1230). In one example, the value of M1 is 8. In another example, the value of M1 is based on at least one of a quantization parameter, a transform unit size, a transform unit depth, a color component type, a position of the chunk in a transform unit, a presence of a last significant coefficient in the chunk, and coefficient statistics of a neighboring chunk.

The video coder may be further configured to code a level remaining value for transform coefficients in the chunk (1240). The level remaining value represents the absolute value of a corresponding coefficient minus three for transform coefficients in the chunk having a coded greater-than-two flag as 1. The level remaining value represents the absolute value of a corresponding coefficient minus one for transform coefficients in the chunk having a coded significance map flag, but the greater-than-one flag is not coded. The video coder may be further configured to code a sign flag for transform coefficients in the chunk, wherein the sign flag indicates the sign of the particular transform coefficient (1250).

In one example of the disclosure, the significance map flag, the greater-than-one flag, and the greater-than-two flag are coded using CABAC with an adaptive context model. The level remaining value is coded using Golomb-Rice coding in CABAC bypass mode. The sign flag is coded in CABAC bypass mode. In another example of the disclosure, the level remaining value is coded using Golomb-Rice coding, wherein Golomb-Rice coding is adapted according to a Golomb parameter. The Golomb Parameter is determined based on at least one of a quantization parameter, a transform unit size, a transform unit depth, a prediction mode, a color component type, and coefficients statistics of neighboring chunks.

In another example of the disclosure, the significance map flag is coded first, the greater-than-one flag is coded second, the greater-than-two flag is coded third, and the level remaining value is coded after the greater-than-two flag. Each of the significance map flag, the greater-than-one flag, the greater-than-two flag, and the level remaining value are coded for the transform coefficients in the chunk according to a scan order. In one example, the scan order is an inverse diagonal scan order.

According to other examples of the disclosure, the chunk is a subblock of a transform unit. The chunk may be a subblock of 16 transform coefficients of a transform unit. In another example, the chunk is an entire transform unit. In another example, the chunk is a number of consecutive transform coefficients along a scan order.

In the case that a video encoder is performing the method of FIG. 12, the method may further comprise encoding pixel data to produce residual video data, transforming the residual video data to produce the chunk of transform coefficients, and signaling the coded significance map flag, the coded greater-than-one flag, and the coded greater-than-two flag, in an encoded video bitstream. Additionally, in another example, the video encoder may signal the value of M1 in an encoded video bitstream. The value of M1 may be signaled in at least one of a sequence parameter set, a picture parameter set, an adaptation parameter set, and a slice header.

In the case that a video decoder is performing the method of FIG. 12, the method may further comprise receiving the significance map flag, the greater-than-one flag, and the greater-than-two flag in an encoded video bitstream, inverse transforming the chunk of transform coefficients to produce residual video data, and decoding the residual video data to produce pixel data.

Figure 13:
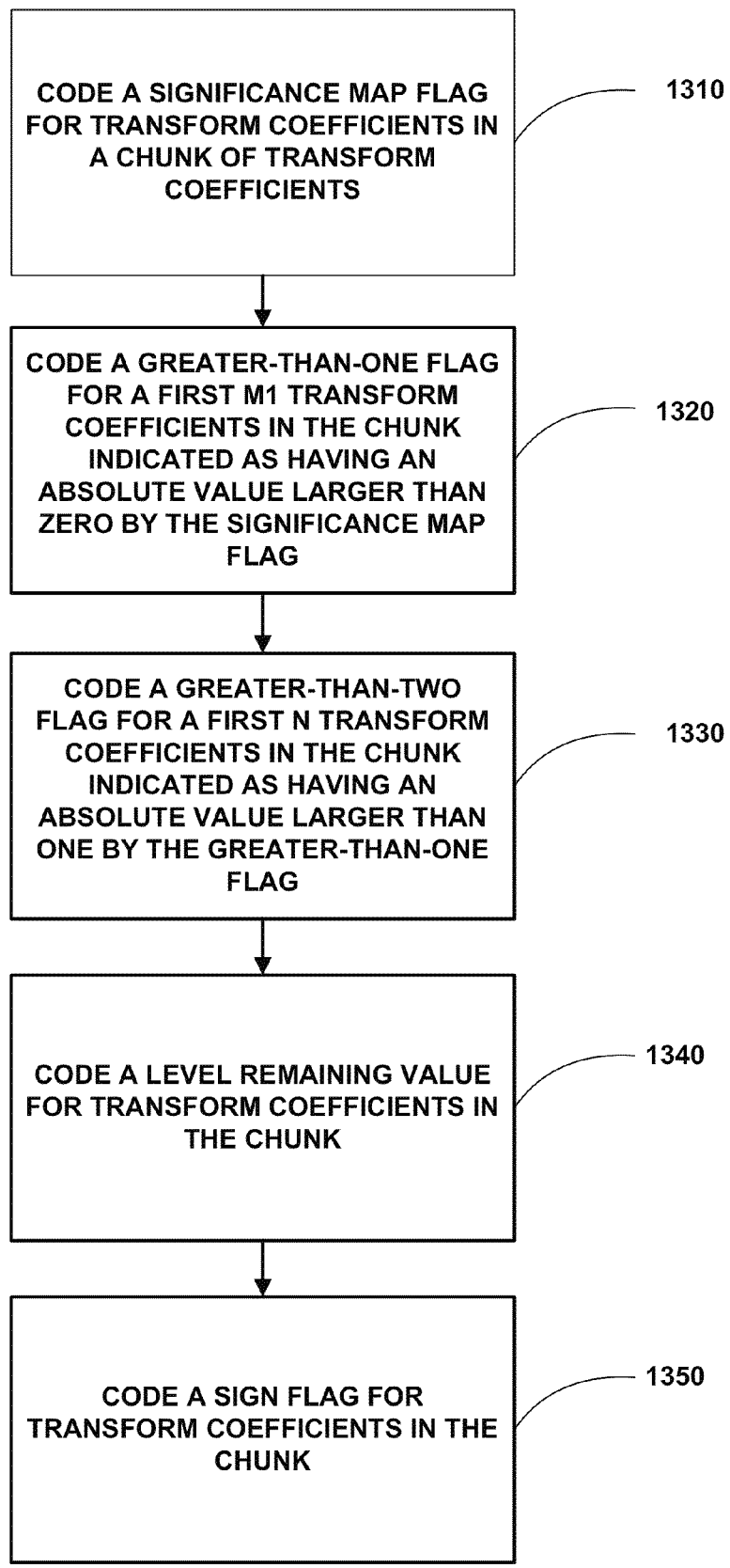
FIG. 13 is a flowchart showing another example method according to the techniques of this disclosure.

FIG. 13 is a flowchart showing another example method according to the techniques of this disclosure. The method of FIG. 13 may be executed by a video coder (e.g., by video encoder 20 of FIG. 9 or by video decoder 30 of FIG. 10).

Video encoder 20 and video decoder 30 (i.e., a video coder) may be configured to perform a method of coding transform coefficients in a video coding process. The video coder may be configured to code a significance map flag for transform coefficients in a chunk of transform coefficients, wherein the significance map flag indicates whether or not a particular transform coefficient has an absolute value greater than zero (1310). The video coder may be further configured to code a greater-than-one flag for a first M1 transform coefficients in the chunk indicated as having an absolute value larger than zero by the significance map flag, wherein the greater-than-one flag indicates whether or not the particular transform coefficient has an absolute value greater than one (1320). M1 is less than a maximum number of transform coefficients in the chunk. The video coder may be further configured to code a greater-than-two flag for a first N transform coefficients in the chunk indicated as having an absolute value larger than one by the greater-than-one flag, wherein the greater-than-two flag indicates whether or not the particular transform coefficient has an absolute value greater than two, wherein N is less than a maximum number of transform coefficients in the chunk (1330). In one example, the value of N is 1. In another example, the value of N is based on at least one of a quantization parameter, a transform unit size, a transform unit depth, a color component type, a position of the chunk in a transform unit, a presence of a last significant coefficient in the chunk, and coefficient statistics of a neighboring chunk. In one example, the value of M1 is 8. In another example, the value of M1 is based on at least one of a quantization parameter, a transform unit size, a transform unit depth, a color component type, a position of the chunk in a transform unit, a presence of a last significant coefficient in the chunk, and coefficient statistics of a neighboring chunk.

The video coder may be further configured to code a level remaining value for transform coefficients in the chunk (1340). The level remaining value represents the absolute value of a corresponding coefficient minus three for transform coefficient in the chunk having a coded greater-than-two flag as 1. The level remaining value represents the absolute value of a corresponding coefficient minus two for transform coefficients in the chunk having a coded greater-than-one flag as 1, but the greater-than-two flag is not coded. The level remaining value represents the absolute value of a corresponding coefficient minus one for transform coefficients in a chunk that are non-zero but do not have a coded greater-than-one flag. The video coder may be further configured to code a sign flag for transform coefficients in the chunk, wherein the sign flag indicates the sign of the particular transform coefficient (1350).

In one example of the disclosure, a method of coding transform coefficients in a video coding process comprises coding a significance map flag for transform coefficients in a chunk of transform coefficients, wherein the significance map flag indicates whether or not a particular transform coefficient has an absolute value greater than zero, coding a greater-than-one flag for a first M1 transform coefficients in the chunk indicated as having an absolute value larger than zero by the significance map flag, wherein the greater-than-one flag indicates whether or not the particular transform coefficient has an absolute value greater than one, wherein M1 is less than a maximum number of transform coefficients in the chunk, and coding a greater-than-two flag for transform coefficients in the chunk indicated as having an absolute value larger than one by the greater-than-one flag, wherein the greater-than-two flag indicates whether or not the particular transform coefficients has an absolute value greater than two.

In another example of the disclosure, the method may further comprise coding a level remaining value for transform coefficients in the chunk, wherein the level remaining value represents the absolute value of a corresponding coefficient minus three for transform coefficients in the chunk having a coded greater-than-two flag as 1, and wherein the level remaining value represents the absolute value of a corresponding coefficient minus one for transform coefficients in the chunk having a coded significance map flag, but the greater-than-one flag is not coded.

In another example of the disclosure, the method may further comprise coding a sign flag for transform coefficients in the chunk, wherein the sign flag indicates the sign of the particular transform coefficient.

In another example of the disclosure, the significance map flag, the greater-than-one flag, and the greater-than-two flag are coded using context adaptive binary arithmetic coding (CABAC) with an adaptive context model, and the level remaining value is coded in CABAC bypass mode, and wherein the sign flag is coded in CABAC bypass mode.

In another example of the disclosure, the method may further comprise coding the level remaining value using a Golomb parameter, wherein the Golomb Parameter is determined based on at least one of a quantization parameter, a transform unit size, a transform unit depth, a prediction mode, a color component type, and coefficients statistics of neighboring chunks.

In another example of the disclosure, the significance map flag is coded first, the greater-than-one flag is coded second, the greater-than-two flag is coded third, and wherein the level remaining value is coded after the greater-than-two flag.

In another example of the disclosure, each of the significance map flag, the greater-than-one flag, the greater-than-two flag, and the level remaining value are coded for the transform coefficients in the chunk according to a scan order.

In another example of the disclosure, the scan order is an inverse diagonal scan order. In another example of the disclosure, the chunk is a subblock of a transform unit. In another example of the disclosure, the chunk is a subblock of 16 transform coefficient of a transform unit. In another example of the disclosure, the chunk is a transform unit. In another example of the disclosure, the chunk is a number of consecutive transform coefficients along a scan order. In another example of the disclosure, the scan order is an inverse scan order.

In another example of the disclosure, the value of M1 is 8. In another example of the disclosure, the value of M1 is based on at least one of a quantization parameter, a transform unit size, a transform unit depth, a color component type, a position of the chunk in a transform unit, a presence of a last significant coefficient in the chunk, and coefficient statistics of a neighboring chunk.

In another example of the disclosure, the video coding process is a video encoding process, the method further comprising encoding pixel data to produce residual video data, transforming the residual video data to produce the chunk of transform coefficients, and signaling the coded significance map flag, the coded greater-than-one flag, and the coded greater-than-two flag in an encoded video bitstream.

In another example of the disclosure, the method further comprise signaling the value of M1 in an encoded video bitstream. In another example of the disclosure, the value of M1 is signaled in at least one of a sequence parameter set, a picture parameter set, an adaptation parameter set, and a slice header.

In another example of the disclosure, the video coding process is a video decoding process, the method further comprising receiving the significance map flag, the greater-than-one flag, and the greater-than-two flag in an encoded video bitstream, inverse transforming the chunk of transform coefficients to produce residual video data, and decoding the residual video data to produce pixel data.

In another example of the disclosure, coding the greater-the-two flag comprises coding the greater-than-one flag for a first N transform coefficients in the chunk indicated as having an absolute value larger than one by the greater-than-one flag, wherein N is less than a maximum number of transform coefficients in the chunk, and wherein the method further comprising coding a level remaining value for transform coefficients in the chunk, wherein the level remaining value represents the absolute value of a corresponding coefficient minus three for transform coefficient in the chunk having a coded greater-than-two flag as 1, wherein the level remaining value represents the absolute value of a corresponding coefficient minus two for transform coefficients in the chunk having a coded greater-than-one flag as 1, but the greater-than-two flag is not coded, and wherein the level remaining value represents the absolute value of a corresponding coefficient minus one for transform coefficients in a chunk that are non-zero but do not have a coded greater-than-one flag.

In another example of the disclosure, the value of M1 is 8.

In another example of the disclosure, an apparatus configured to code transform coefficients in a video coding process comprises a video coder configured to code a significance map flag for transform coefficients in a chunk of transform coefficients, wherein the significance map flag indicates whether or not a particular transform coefficient has an absolute value greater than zero, code a greater-than-one flag for a first M1 transform coefficients in the chunk indicated as having an absolute value larger than zero by the significance map flag, wherein the greater-than-one flag indicates whether or not the particular transform coefficient has an absolute value greater than one, wherein M1 is less than a maximum number of transform coefficients in the chunk, and code a greater-than-two flag for transform coefficients in the chunk indicated as having an absolute value larger than one by the greater-than-one flag, wherein the greater-than-two flag indicates whether or not the particular transform coefficients has an absolute value greater than two.

In another example of the disclosure, the video coder is further configured to code a level remaining value for transform coefficients in the chunk, wherein the level remaining value represents the absolute value of a corresponding coefficient minus three for transform coefficients in the chunk having a coded greater-than-two flag as 1, and wherein the level remaining value represents the absolute value of a corresponding coefficient minus one for transform coefficients in the chunk having a coded significance map flag, but the greater-than-one flag is not coded.

In another example of the disclosure, the video coder is further configured to code a sign flag for transform coefficients in the chunk, wherein the sign flag indicates the sign of the particular transform coefficient.

In another example of the disclosure, the significance map flag, the greater-than-one flag, and the greater-than-two flag are coded using context adaptive binary arithmetic coding (CABAC) with an adaptive context model, and wherein the level remaining value is coded in CABAC bypass mode, and wherein the sign flag is coded in CABAC bypass mode.

In another example of the disclosure, the video coder is further configured to code the level remaining value using a Golomb parameter, and wherein the Golomb Parameter is determined based on at least one of a quantization parameter, a transform unit size, a transform unit depth, a prediction mode, a color component type, and coefficients statistics of neighboring chunks.

In another example of the disclosure, the significance map flag is coded first, the greater-than-one flag is coded second, the greater-than-two flag is coded third, and wherein the level remaining value is coded after the greater-than-two flag. In another example of the disclosure, the significance map flag, the greater-than-one flag, the greater-than-two flag, and the level remaining value are coded for the transform coefficients in the chunk according to a scan order.

In another example of the disclosure, the scan order is an inverse diagonal scan order. In another example of the disclosure, the chunk is a subblock of a transform unit. In another example of the disclosure, the chunk is a subblock of 16 transform coefficient of a transform unit. In another example of the disclosure, the chunk is a transform unit. In another example of the disclosure, the chunk is a number of consecutive transform coefficients along a scan order. In another example of the disclosure the scan order is an inverse scan order.

In another example of the disclosure, the value of M1 is 8. In another example of the disclosure, the value of M1 is based on at least one of a quantization parameter, a transform unit size, a transform unit depth, a color component type, a position of the chunk in a transform unit, a presence of a last significant coefficient in the chunk, and coefficient statistics of a neighboring chunk.

In another example of the disclosure, the video coder is a video encoder, and the video encoder is further configured to encode pixel data to produce residual video data, transform the residual video data to produce the chunk of transform coefficients, and signal the coded significance map flag, the coded greater-than-one flag, and the coded greater-than-two flag in an encoded video bitstream. In another example of the disclosure, the video coder is further configured to signal the value of M1 in an encoded video bitstream. In another example of the disclosure, the value of M1 is signaled in at least one of a sequence parameter set, a picture parameter set, an adaptation parameter set, and a slice header.

In another example of the disclosure, the video coder is a video decoder, and the video decoder is further configured to receive the significance map flag, the greater-than-one flag, and the greater-than-two flag in an encoded video bitstream, inverse transform the chunk of transform coefficients to produce residual video data, and decode the residual video data to produce pixel data.

In another example of the disclosure, the video coder is further configured to code the greater-than-two flag for a first N transform coefficients in the chunk indicated as having an absolute value larger than one by the greater-than-one flag, wherein N is less than a maximum number of transform coefficients in the chunk, wherein the method further comprising coding a level remaining value for transform coefficients in the chunk, wherein the level remaining value represents the absolute value of a corresponding coefficient minus three for transform coefficient in the chunk having a coded greater-than-two flag as 1, wherein the level remaining value represents the absolute value of a corresponding coefficient minus two for transform coefficients in the chunk having a coded greater-than-one flag as 1, but the greater-than-two flag is not coded, and wherein the level remaining value represents the absolute value of a corresponding coefficient minus one for transform coefficients in a chunk that are non-zero but do not have a coded greater-than-one flag. In another example of the disclosure, the value of N is 1.

In another example of the disclosure, an apparatus configured to code transform coefficients in a video coding process comprises means for coding a significance map flag for transform coefficients in a chunk of transform coefficients, wherein the significance map flag indicates whether or not a particular transform coefficient has an absolute value greater than zero, means for coding a greater-than-one flag for a first M1 transform coefficients in the chunk indicated as having an absolute value larger than zero by the significance map flag, wherein the greater-than-one flag indicates whether or not the particular transform coefficient has an absolute value greater than one, wherein M1 is less than a maximum number of transform coefficients in the chunk, and means for coding a greater-than-two flag for transform coefficients in the chunk indicated as having an absolute value larger than one by the greater-than-one flag, wherein the greater-than-two flag indicates whether or not the particular transform coefficients has an absolute value greater than two.

In another example of the disclosure, a computer-readable storage medium storing instructions that, when executed, cause one or more processors of a device configured to code video data to code a significance map flag for transform coefficients in a chunk of transform coefficients, wherein the significance map flag indicates whether or not a particular transform coefficient has an absolute value greater than zero, code a greater-than-one flag for a first M1 transform coefficients in the chunk indicated as having an absolute value larger than zero by the significance map flag, wherein the greater-than-one flag indicates whether or not the particular transform coefficient has an absolute value greater than one, wherein M1 is less than a maximum number of transform coefficients in the chunk, and code a greater-than-two flag for transform coefficients in the chunk indicated as having an absolute value larger than one by the greater-than-one flag, wherein the greater-than-two flag indicates whether or not the particular transform coefficients has an absolute value greater than two.

In another example of the disclosure, a method of coding transform coefficients in a video coding process comprises coding a significance map flag for transform coefficients in a chunk of transform coefficients, wherein the significance map flag indicates whether or not a particular transform coefficient has an absolute value greater than zero, coding a greater-than-one flag for transform coefficients in the chunk of transform coefficients indicated as having an absolute value larger than zero by the significance map flag, wherein the greater-than-one flag indicates whether or not a particular transform coefficient has an absolute value greater than one, and coding a greater-than-two flag for a first N transform coefficients in the chunk indicated as having an absolute value larger than one by the greater-than-one flag, wherein the greater-than-two flag indicates whether or not the particular transform coefficient has an absolute value greater than two, wherein N is less than a maximum number of transform coefficients in the chunk.

In another example of the disclosure, the method further comprises coding a level remaining value for transform coefficients in the chunk, wherein the level remaining value represents the absolute value of a corresponding coefficient minus three for transform coefficients in the chunk having a coded greater-than-two flag as 1, and wherein the level remaining value represents the absolute value of a corresponding coefficient minus two for transform coefficients in the chunk having a coded greater-than-one flag as 1, but the greater-than-two flag is not coded.

In another example of the disclosure, the method further comprises coding a sign flag for transform coefficients in the chunk, wherein the sign flag indicates the sign of the particular transform coefficient.

In another example of the disclosure, the significance map flag, the greater-than-one flag, and the greater-than-two flag are coded using context adaptive binary arithmetic coding (CABAC) with an adaptive context model, wherein the level remaining value is coded in CABAC bypass mode, and wherein the sign flag is coded in CABAC bypass mode.

In another example of the disclosure, the method further comprises coding the level remaining value using a Golomb parameter, and wherein the Golomb Parameter is determined based on at least one of a quantization parameter, a transform unit size, a transform unit depth, a prediction mode, a color component type, and coefficients statistics of neighboring chunks.

In another example of the disclosure, the significance map flag is coded first, the greater-than-one flag is coded second, the greater-than-two flag is coded third, and the level remaining value is coded after the greater-than-two flag.

In another example of the disclosure, each of the significance map flag, the greater-than-one flag, the greater-than-two flag, and the level remaining value are coded for the transform coefficients in the chunk according to a scan order.

In another example of the disclosure, the scan order is an inverse diagonal scan order. In another example of the disclosure, the chunk is a subblock of a transform unit. In another example of the disclosure, the chunk is a subblock of 16 transform coefficients of a transform unit. In another example of the disclosure, the chunk is a transform unit. In another example of the disclosure, the chunk is a number of consecutive transform coefficients along a scan order. In another example of the disclosure, the scan order is an inverse scan order.

In another example of the disclosure, the value of N is 1. In another example of the disclosure, the value of N is based on at least one of a quantization parameter, a transform unit size, a transform unit depth, a color component type, a position of the chunk in a transform unit, a presence of a last significant coefficient in the chunk, and coefficient statistics of a neighboring chunk.

In another example of the disclosure, the video coding process is a video encoding process, the method further comprising encoding pixel data to produce residual video data, transforming the residual video data to produce the chunk of transform coefficients, and signaling the coded significance map flag, the coded greater-than-one flag, and the coded greater-than-two flag, in an encoded video bitstream. In another example of the disclosure, the method further comprises signaling the value of N in an encoded video bitstream. In another example of the disclosure, the value of N is signaled in at least one of a sequence parameter set, a picture parameter set, an adaptation parameter set, and a slice header.

In another example of the disclosure, the video coding process is a video decoding process, the method further comprising receiving the significance map flag, the greater-than-one flag, and the greater-than-two flag in an encoded video bitstream, inverse transforming the chunk of transform coefficients to produce residual video data, and decoding the residual video data to produce pixel data.

In another example of the disclosure, coding the greater-the-one flag comprises coding the greater-than-one flag for a first M1 transform coefficients in the chunk that are non-zero, wherein M1 is less than a maximum number of transform coefficients in the chunk, and wherein the method further comprises coding a level remaining value for transform coefficients in the chunk, wherein the level remaining value represents the absolute value of a corresponding coefficient minus three for transform coefficient in the chunk having a coded greater-than-two flag as 1, wherein the level remaining value represents the absolute value of a corresponding coefficient minus two for transform coefficients in the chunk having a coded greater-than-one flag as 1, but the greater-than-two flag is not coded, and wherein the level remaining value represents the absolute value of a corresponding coefficient minus one for transform coefficients in a chunk that are non-zero but do not have a coded greater-than-one flag. In another example of the disclosure, the value of M1 is 8.

In another example of the disclosure, an apparatus configured to code transform coefficients in a video coding process comprises a video coder configured to code a significance map flag for transform coefficients in a chunk of transform coefficients, wherein the significance map flag indicates whether or not a particular transform coefficient has an absolute value greater than zero, code a greater-than-one flag for transform coefficients in the chunk of transform coefficients indicated as having an absolute value larger than zero by the significance map flag, wherein the greater-than-one flag indicates whether or not a particular transform coefficient has an absolute value greater than one, and code a greater-than-two flag for a first N transform coefficients in the chunk indicated as having an absolute value larger than one by the greater-than-one flag, wherein the greater-than-two flag indicates whether or not the particular transform coefficient has an absolute value greater than two, wherein N is less than a maximum number of transform coefficients in the chunk.

In another example of the disclosure, the video coder is further configured to code a level remaining value for transform coefficients in the chunk, wherein the level remaining value represents the absolute value of a corresponding coefficient minus three for transform coefficients in the chunk having a coded greater-than-two flag as 1, and wherein the level remaining value represents the absolute value of a corresponding coefficient minus two for transform coefficients in the chunk having a coded greater-than-one flag as 1, but the greater-than-two flag is not coded.

In another example of the disclosure, the video coder is further configured to code a sign flag for transform coefficients in the chunk, wherein the sign flag indicates the sign of the particular transform coefficient.

In another example of the disclosure, the significance map flag, the greater-than-one flag, and the greater-than-two flag are coded using context adaptive binary arithmetic coding (CABAC) with an adaptive context model, wherein the level remaining value is coded in CABAC bypass mode, and wherein the sign flag is coded in CABAC bypass mode.

In another example of the disclosure, the video coder is further configured to code the level remaining value using a Golomb parameter, and wherein the Golomb Parameter is determined based on at least one of a quantization parameter, a transform unit size, a transform unit depth, a prediction mode, a color component type, and coefficients statistics of neighboring chunks.

In another example of the disclosure, the significance map flag is coded first, the greater-than-one flag is coded second, the greater-than-two flag is coded third, and wherein the level remaining value is coded after the greater-than-two flag.

In another example of the disclosure, each of the significance map flag, the greater-than-one flag, the greater-than-two flag, and the level remaining value are coded for the transform coefficients in the chunk according to a scan order. In another example of the disclosure, the scan order is an inverse diagonal scan order.

In another example of the disclosure, the chunk is a subblock of a transform unit. In another example of the disclosure, the chunk is a subblock of 16 transform coefficients of a transform unit. In another example of the disclosure, the chunk is a transform unit. In another example of the disclosure, the chunk is a number of consecutive transform coefficients along a scan order. In another example of the disclosure, the scan order is an inverse scan order.

In another example of the disclosure, the value of N is 1. In another example of the disclosure, the value of N is based on at least one of a quantization parameter, a transform unit size, a transform unit depth, a color component type, a position of the chunk in a transform unit, a presence of a last significant coefficient in the chunk, and coefficient statistics of a neighboring chunk.

In another example of the disclosure, the video coder is a video encoder, and the video encoder is further configured to encode pixel data to produce residual video data, transform the residual video data to produce the chunk of transform coefficients, and signal the coded significance map flag, the coded greater-than-one flag, and the coded greater-than-two flag, in an encoded video bitstream. In another example of the disclosure, the video coder is further configured to signal the value of N in an encoded video bitstream. In another example of the disclosure, the value of N is signaled in at least one of a sequence parameter set, a picture parameter set, an adaptation parameter set, and a slice header.

In another example of the disclosure, the video coder is a video decoder, and the video decoder is further configured to receive the significance map flag, the greater-than-one flag, and the greater-than-two flag in an encoded video bitstream, inverse transform the chunk of transform coefficients to produce residual video data, and decode the residual video data to produce pixel data.

In another example of the disclosure, the video coder is further configured to code the greater-than-one flag for a first M1 transform coefficients in the chunk that are non-zero, wherein M1 is less than a maximum number of transform coefficients in the chunk, and herein the video coder is further configured to code a level remaining value for transform coefficients in the chunk, wherein the level remaining value represents the absolute value of a corresponding coefficient minus three for transform coefficient in the chunk having a coded greater-than-two flag as 1, wherein the level remaining value represents the absolute value of a corresponding coefficient minus two for transform coefficients in the chunk having a coded greater-than-one flag as 1, but the greaterthan-two flag is not coded, and wherein the level remaining value represents the absolute value of a corresponding coefficient minus one for transform coefficients in a chunk that are non-zero but do not have a coded greater-than-one flag. In another example of the disclosure, the value of M1 is 8.

In another example of the disclosure, an apparatus configured to code transform coefficients in a video coding process comprises means for coding a significance map flag for transform coefficients in a chunk of transform coefficients, wherein the significance map flag indicates whether or not a particular transform coefficient has an absolute value greater than zero, means for coding a greater-than-one flag for transform coefficients in the chunk of transform coefficients indicated as having an absolute value larger than zero by the significance map flag, wherein the greater-than-one flag indicates whether or not a particular transform coefficient has an absolute value greater than one, and means for coding a greater-than-two flag for a first N transform coefficients in the chunk indicated as having an absolute value larger than one by the greater-than-one flag, wherein the greater-than-two flag indicates whether or not the particular transform coefficient has an absolute value greater than two, wherein N is less than a maximum number of transform coefficients in the chunk.

In another example of the disclosure, a computer-readable storage medium storing instructions that, when executed, cause one or more processors configured to code transform coefficients in a video coding process to code a significance map flag for transform coefficients in a chunk of transform coefficients, wherein the significance map flag indicates whether or not a particular transform coefficient has an absolute value greater than zero, code a greater-than-one flag for transform coefficients in the chunk of transform coefficients indicated as having an absolute value larger than zero by the significance map flag, wherein the greater-than-one flag indicates whether or not a particular transform coefficient has an absolute value greater than one, and code a greater-than-two flag for a first N transform coefficients in the chunk indicated as having an absolute value larger than one by the greater-than-one flag, wherein the greater-than-two flag indicates whether or not the particular transform coefficient has an absolute value greater than two, wherein N is less than a maximum number of transform coefficients in the chunk.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding transform coefficients in a video coding process, the method comprising:
    coding a significance map flag for transform coefficients in a chunk of transform coefficients, wherein the significance map flag indicates whether or not a particular transform coefficient has an absolute value greater than zero;
    coding a greater-than-one flag for a first M1 transform coefficients in an inverse scan order in the chunk indicated as having an absolute value larger than zero by the significance map flag, wherein the greater-than-one flag indicates whether or not the particular transform coefficient has an absolute value greater than one, and wherein M1 is less than a maximum number of transform coefficients in the chunk;
    coding a greater-than-two flag for transform coefficients in the chunk indicated as having an absolute value larger than one by the greater-than-one flag, wherein the greater-than-two flag indicates whether or not the particular transform coefficients has an absolute value greater than two; and coding a level remaining value for transform coefficients in the chunk, wherein the level remaining value represents the absolute value of a corresponding coefficient minus three for transform coefficients in the chunk having a coded greater-than-two flag that indicates that the particular transform coefficient has an absolute value greater than two, and wherein the level remaining value represents the absolute value of a corresponding coefficient minus one for transform coefficients in the chunk that are non-zero but do not have a coded greater-than-one flag.

2. The method of claim 1, wherein coding the greater-the-two flag comprises coding the greater-than-one flag for a first N transform coefficients in the inverse scan order in the chunk indicated as having an absolute value larger than one by the greater-than-one flag, wherein N is less than a maximum number of transform coefficients in the chunk, and wherein the level remaining value represents the absolute value of a corresponding coefficient minus two for transform coefficients in the chunk having a coded greater-than-one flag that indicates that the particular transform coefficient has an absolute value greater than one, but the greater-than-two flag is not coded.

3. The method of claim 2, wherein the value of M1 is 8.

4. The method of claim 1, wherein the level remaining value represents the absolute value of a corresponding coefficient minus one for transform coefficients in the chunk having a coded significance map flag, but for which the greater-than-one flag is not coded.

5. The method of claim 4, further comprising:

coding a sign flag for transform coefficients in the chunk, wherein the sign flag indicates the sign of the particular transform coefficient.

6. The method of claim 5, wherein the significance map flag, the greater-than-one flag, and the greater-than-two flag are coded using context adaptive binary arithmetic coding (CABAC) with an adaptive context model, and wherein the level remaining value is coded in CABAC bypass mode, and wherein the sign flag is coded in CABAC bypass mode.

7. The method of claim 6, further comprising:

coding the level remaining value using a Golomb parameter, and wherein the Golomb Parameter is determined based on at least one of a quantization parameter, a transform unit size, a transform unit depth, a prediction mode, a color component type, and coefficients statistics of neighboring chunks of transform coefficients.

8. The method of claim 5, further comprising coding the significance map flag first, the greater-than-one flag second, the greater-than-two flag third, and the level remaining value after the greater-than-two flag.

9. The method of claim 8, further comprising coding each of the significance map flag, the greater-than-one flag, the greater-than-two flag, and the level remaining value for the transform coefficients in the chunk according to the inverse scan order.

10. The method of claim 9, wherein the inverse scan order is an inverse diagonal scan order.

11. The method of claim 1, wherein the chunk is a subblock of a transform unit.

12. The method of claim 1, wherein the chunk is a subblock of 16 transform coefficients of a transform unit.

13. The method of claim 1, wherein the chunk is a transform unit.

14. The method of claim 1, wherein the chunk is a number of consecutive transform coefficients along the inverse scan order within a transform unit.

15. The method of claim 14, wherein the scan order is an inverse diagonal scan order.

16. The method of claim 1, wherein the value of M1 is 8.

17. The method of claim 1, wherein the value of M1 is based on at least one of a quantization parameter, a transform unit size, a transform unit depth, a color component type, a position of the chunk in a transform unit, a presence of a last significant coefficient in the chunk, and coefficient statistics of a neighboring chunk.

18. The method of claim 1, wherein the video coding process is a video encoding process, the method further comprising:

encoding pixel data to produce residual video data;

transforming the residual video data to produce the chunk of transform coefficients; and signaling the coded significance map flag, the coded greater-than-one flag, and the coded greater-than-two flag in an encoded video bitstream.

19. The method of claim 1, further comprising:

signaling the value of M1 in an encoded video bitstream.

20. The method of claim 19, wherein the value of M1 is signaled in at least one of a sequence parameter set, a picture parameter set, an adaptation parameter set, and a slice header.

21. The method of claim 1, wherein the video coding process is a video decoding process, the method further comprising:

receiving the significance map flag, the greater-than-one flag, and the greater-than-two flag in an encoded video bitstream;

inverse transforming the chunk of transform coefficients to produce residual video data; and decoding the residual video data to produce pixel data.

22. An apparatus configured to code transform coefficients in a video coding process, the apparatus comprising:

a memory configured to store transform coefficients; and a video coder configured to:

code a significance map flag for the transform coefficients in a chunk of transform coefficients, wherein the significance map flag indicates whether or not a particular transform coefficient has an absolute value greater than zero;

code a greater-than-one flag for a first M1 transform coefficients in an inverse scan order in the chunk indicated as having an absolute value larger than zero by the significance map flag, wherein the greater-than-one flag indicates whether or not the particular transform coefficient has an absolute value greater than one, and wherein M1 is less than a maximum number of transform coefficients in the chunk;

code a greater-than-two flag for transform coefficients in the chunk indicated as having an absolute value larger than one by the greater-than-one flag, wherein the greater-than-two flag indicates whether or not the particular transform coefficients has an absolute value greater than two; and code a level remaining value for transform coefficients in the chunk, wherein the level remaining value represents the absolute value of a corresponding coefficient minus three for transform coefficient in the chunk having a coded greater-than-two flag that indicates that the particular transform coefficient has an absolute value greater than two, and wherein the level remaining value represents the absolute value of a corresponding coefficient minus one for transform coefficients in the chunk that are non-zero but do not have a coded greater-than-one flag.

23. The apparatus of claim 22, wherein the video coder is further configured to code the greater-than-two flag for a first N transform coefficients in the inverse scan order in the chunk indicated as having an absolute value larger than one by the greater-than-one flag, wherein N is less than a maximum number of transform coefficients in the chunk, and wherein the level remaining value represents the absolute value of a corresponding coefficient minus two for transform coefficients in the chunk having a coded greater-than-one flag that indicates that the particular transform coefficient has an absolute value greater than one, but the greater-than-two flag is not coded.

24. The apparatus of claim 23, wherein the value of N is 1.

25. The apparatus of claim 22, wherein the level remaining value represents the absolute value of a corresponding coefficient minus one for transform coefficients in the chunk having a coded significance map flag, but for which the greater-than-one flag is not coded.

26. The apparatus of claim 25, the video coder further configured to:

code a sign flag for transform coefficients in the chunk, wherein the sign flag indicates the sign of the particular transform coefficient.

27. The apparatus of claim 26, wherein the significance map flag, the greater-than-one flag, and the greater-than-two flag are coded using context adaptive binary arithmetic coding (CABAC) with an adaptive context model, and wherein the level remaining value is coded in CABAC bypass mode, and wherein the sign flag is coded in CABAC bypass mode.

28. The apparatus of claim 27, the video coder further configured to:

code the level remaining value using a Golomb parameter, and wherein the Golomb Parameter is determined based on at least one of a quantization parameter, a transform unit size, a transform unit depth, a prediction mode, a color component type, and coefficients statistics of neighboring chunks of transform coefficients.

29. The apparatus of claim 26, the video coder further configured to code the significance map flag first, the greater-than-one flag second, the greater-than-two flag third, and the level remaining value after the greater-than-two flag.

30. The apparatus of claim 29, the video coder further configured to code each of the significance map flag, the greater-than-one flag, the greater-than-two flag, and the level remaining value for the transform coefficients in the chunk according to the inverse scan order.

31. The apparatus of claim 30, wherein the inverse scan order is an inverse diagonal scan order.

32. The apparatus of claim 22, wherein the chunk is a subblock of a transform unit.

33. The apparatus of claim 22, wherein the chunk is a subblock of 16 transform coefficients of a transform unit.

34. The apparatus of claim 22, wherein the chunk is a transform unit.

35. The apparatus of claim 22, wherein the chunk is a number of consecutive transform coefficients along the inverse scan order within a transform unit.

36. The apparatus of claim 35, wherein the inverse scan order is an inverse diagonal scan order.

37. The apparatus of claim 22, wherein the value of M1 is 8.

38. The apparatus of claim 22, wherein the value of M1 is based on at least one of a quantization parameter, a transform unit size, a transform unit depth, a color component type, a position of the chunk in a transform unit, a presence of a last significant coefficient in the chunk, and coefficient statistics of a neighboring chunk.

39. The apparatus of claim 22, wherein the video coder is a video encoder, the video encoder further configured to:

encode pixel data to produce residual video data;
transform the residual video data to produce the chunk of transform coefficients; and
signal the coded significance map flag, the coded greater-than-one flag, and the coded greater-than-two flag in an encoded video bitstream.

40. The apparatus of claim 22, the video coder further configured to:

signal the value of M1 in an encoded video bitstream.

41. The apparatus of claim 40, wherein value of M1 is signaled in at least one of a sequence parameter set, a picture parameter set, an adaptation parameter set, and a slice header.

42. The apparatus of claim 22, wherein the video coder is a video decoder, the video decoder further configured to:

receive the significance map flag, the greater-than-one flag, and the greater-than-two flag in an encoded video bitstream;
inverse transform the chunk of transform coefficients to produce residual video data; and
decode the residual video data to produce pixel data.

43. An apparatus configured to code transform coefficients in a video coding process, the apparatus comprising:

means for coding a significance map flag for transform coefficients in a chunk of transform coefficients, wherein the significance map flag indicates whether or not a particular transform coefficient has an absolute value greater than zero;

means for coding a greater-than-one flag for a first M1 transform coefficients in an inverse scan order in the chunk indicated as having an absolute value larger than zero by the significance map flag, wherein the greater-than-one flag indicates whether or not the particular transform coefficient has an absolute value greater than one, and wherein M1 is less than a maximum number of transform coefficients in the chunk;

means for coding a greater-than-two flag for transform coefficients in the chunk indicated as having an absolute value larger than one by the greater-than-one flag, wherein the greater-than-two flag indicates whether or not the particular transform coefficients has an absolute value greater than two; and means for coding a level remaining value for transform coefficients in the chunk, wherein the level remaining value represents the absolute value of a corresponding coefficient minus three for transform coefficient in the chunk having a coded greater-than-two flag that indicates that the particular transform coefficient has an absolute value greater than two, and wherein the level remaining value represents the absolute value of a corresponding coefficient minus one for transform coefficients in the chunk that are non-zero but do not have a coded greater-than-one flag.

44. A non-transitory computer-readable storage medium storing instructions that, when executed, cause one or more processors of a device configured to code video data to:

code a significance map flag for transform coefficients in a chunk of transform coefficients, wherein the significance map flag indicates whether or not a particular transform coefficient has an absolute value greater than zero;

code a greater-than-one flag for a first M1 transform coefficients in an inverse scan order in the chunk indicated as having an absolute value larger than zero by the significance map flag, wherein the greater-than-one flag indicates whether or not the particular transform coefficient has an absolute value greater than one, and wherein M1 is less than a maximum number of transform coefficients in the chunk;

code a greater-than-two flag for transform coefficients in the chunk indicated as having an absolute value larger than one by the greater-than-one flag, wherein the greater-than-two flag indicates whether or not the particular transform coefficients has an absolute value greater than two; and code a level remaining value for transform coefficients in the chunk, wherein the level remaining value represents the absolute value of a corresponding coefficient minus three for transform coefficient in the chunk having a coded greater-than-two flag that indicates that the particular transform coefficient has an absolute value greater than two, and wherein the level remaining value represents the absolute value of a corresponding coefficient minus one for transform coefficients in the chunk that are non-zero but do not have a coded greater-than-one flag.

45. A method of coding transform coefficients in a video coding process, the method comprising:

coding a significance map flag for transform coefficients in a chunk of transform coefficients, wherein the significance map flag indicates whether or not a particular transform coefficient has an absolute value greater than zero;

coding a greater-than-one flag for transform coefficients in the chunk of transform coefficients indicated as having an absolute value larger than zero by the significance map flag, wherein the greater-than-one flag indicates whether or not a particular transform coefficient has an absolute value greater than one;

coding a greater-than-two flag for a first N transform coefficients in an inverse scan order in the chunk indicated as having an absolute value larger than one by the greater-than-one flag, wherein the greater-than-two flag indicates whether or not the particular transform coefficient has an absolute value greater than two, and wherein N is less than a maximum number of transform coefficients in the chunk; and coding a level remaining value for transform coefficients in the chunk, wherein the level remaining value represents the absolute value of a corresponding coefficient minus three for transform coefficients in the chunk having a coded greater-than-two flag that indicates that the particular transform coefficient has an absolute value greater than two, and wherein the level remaining value represents the absolute value of a corresponding coefficient minus two for transform coefficients in the chunk having a coded greater-than-one flag that indicates that the particular transform coefficient has an absolute value greater than one, but the greater-than-two flag is not coded.

46. The method of claim 45, further comprising:
coding a sign flag for transform coefficients in the chunk, wherein the sign flag indicates the sign of the particular transform coefficient.

47. The method of claim 45, wherein the value of N is 1.

48. An apparatus configured to code transform coefficients in a video coding process, the apparatus comprising:
a memory configured to store transform coefficients; and
a video coder configured to:
code a significance map flag for the transform coefficients in a chunk of transform coefficients, wherein the significance map flag indicates whether or not a particular transform coefficient has an absolute value greater than zero;

code a greater-than-one flag for transform coefficients in the chunk of transform coefficients indicated as having an absolute value larger than zero by the significance map flag, wherein the greater-than-one flag indicates whether or not a particular transform coefficient has an absolute value greater than one;

code a greater-than-two flag for a first N transform coefficients in an inverse scan order in the chunk indicated as having an absolute value larger than one by the greater-than-one flag, wherein the greater-than-two flag indicates whether or not the particular transform coefficient has an absolute value greater than two, and wherein N is less than a maximum number of transform coefficients in the chunk; and code a level remaining value for transform coefficients in the chunk, wherein the level remaining value represents the absolute value of a corresponding coefficient minus three for transform coefficients in the chunk having a coded greater-than-two flag that indicates that the particular transform coefficient has an absolute value greater than two, and wherein the level remaining value represents the absolute value of a corresponding coefficient minus two for transform coefficients in the chunk having a coded greater-than-one flag that indicates that the particular transform coefficient has an absolute value greater than one, but the greater-than-two flag is not coded.

49. The apparatus of claim 48, the video coder further configured to:
code a sign flag for transform coefficients in the chunk, wherein the sign flag indicates the sign of the particular transform coefficient.

50. The apparatus of claim 48, wherein the value of N is 1.

* * * * *